US008589687B2

(12) United States Patent
Carter et al.

(10) Patent No.: US 8,589,687 B2
(45) Date of Patent: Nov. 19, 2013

(54) ARCHITECTURE FOR SUPPORTING SECURE COMMUNICATION NETWORK SETUP IN A WIRELESS LOCAL AREA NETWORK (WLAN)

(75) Inventors: Edward Carter, Sunnyvale, CA (US); Manoj Thawani, Sunnyvale, CA (US); Manas Deb, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 2664 days.

(21) Appl. No.: 11/208,275

(22) Filed: Aug. 18, 2005

(65) Prior Publication Data

US 2006/0041750 A1    Feb. 23, 2006

Related U.S. Application Data

(60) Provisional application No. 60/602,396, filed on Aug. 18, 2004, provisional application No. 60/671,120, filed on Apr. 14, 2005.

(51) Int. Cl.
*H04L 9/32* (2006.01)
*H04M 1/66* (2006.01)

(52) U.S. Cl.
USPC .......................................... 713/170; 455/410

(58) Field of Classification Search
USPC ................. 713/170; 380/239; 455/410, 411
See application file for complete search history.

(56) References Cited

U.S. PATENT DOCUMENTS

| | | | | |
|---|---|---|---|---|
| 5,940,509 A * | 8/1999 | Jovanovich et al. | .......... | 713/191 |
| 6,052,600 A * | 4/2000 | Fette et al. | .................... | 455/509 |
| 6,212,639 B1 * | 4/2001 | Erickson et al. | ................ | 726/26 |
| 6,785,816 B1 * | 8/2004 | Kivimaki et al. | ............. | 713/181 |
| 6,829,358 B2 * | 12/2004 | Jiang | .............................. | 380/272 |
| 6,850,916 B1 * | 2/2005 | Wang | ............................. | 705/64 |
| 6,877,093 B1 * | 4/2005 | Desai et al. | ..................... | 713/156 |
| 6,904,415 B2 * | 6/2005 | Krahn et al. | ..................... | 705/50 |
| 7,197,647 B1 * | 3/2007 | Van Essen et al. | ............ | 713/189 |
| 7,359,696 B2 * | 4/2008 | Tanaka et al. | ................. | 455/411 |
| 2001/0032318 A1 * | 10/2001 | Yip et al. | ...................... | 713/190 |
| 2002/0114453 A1 * | 8/2002 | Bartholet et al. | .............. | 380/44 |
| 2003/0018889 A1 * | 1/2003 | Burnett et al. | ................ | 713/153 |

(Continued)

OTHER PUBLICATIONS

IEEE Std 802.1X™—2004, "IEEE Standard for Local and metropolitan area networks: Port-Based Network Access Control", pp. 1-51, Dec. 13, 2004.

(Continued)

*Primary Examiner* — Techane Gergiso
(74) *Attorney, Agent, or Firm* — Garlick & Markison; Edward J. Marshall

(57) ABSTRACT

In a communication network, an architecture for supporting secure communication network setup in a wireless local area network (WLAN) is provided. The architecture may be utilized in a configurator station or in a client station for establishing a secure communication setup between the client station and the corresponding WLAN. The architecture may comprise an input interface that may be configured by a user to interface with the user's hardware or software configuration buttons. The architecture may also comprise a finite state machine (FSM), a packet processor, and a Diffie-Hellman (DH) generator. The input interface, the FSM, the packet processor, and the DH generator may be associated with the secure communication setup process. The architecture may also comprise interfaces to communicate with a wireless driver and/or an Ethernet driver, and interfaces to communicate with persistent storage, such as non-volatile ready access memory (NVRAM).

30 Claims, 14 Drawing Sheets

(56) References Cited

U.S. PATENT DOCUMENTS

| | | | |
|---|---|---|---|
| 2003/0078072 A1* | 4/2003 | Serceki et al. | 455/557 |
| 2003/0212768 A1* | 11/2003 | Sullivan | 709/220 |
| 2003/0212889 A1* | 11/2003 | Khieu et al. | 713/164 |
| 2004/0019789 A1* | 1/2004 | Buer | 713/170 |
| 2004/0198319 A1* | 10/2004 | Whelan et al. | 455/411 |
| 2004/0203941 A1* | 10/2004 | Kaplan et al. | 455/466 |
| 2005/0086466 A1* | 4/2005 | Funnell et al. | 713/150 |
| 2005/0114682 A1* | 5/2005 | Zimmer et al. | 713/187 |
| 2005/0193103 A1* | 9/2005 | Drabik | 709/221 |
| 2005/0226175 A1* | 10/2005 | Gupta et al. | 370/310 |
| 2005/0276417 A1* | 12/2005 | Funnell | 380/270 |
| 2008/0292101 A1* | 11/2008 | Macchi | 380/270 |

OTHER PUBLICATIONS

IEEE Std 802.11™, 2003 Edition, "Information technology—Telecommunications and information exchange between systems—Local and metropolitan area networks—Specific requirements—Part 11: Wireless LAN Medium Access Control (MAC) and Physical Layer (PHY) Specifications", pp. 9-65, Jun. 12, 2003.

* cited by examiner

ARCHITECTURE FOR SUPPORTING SECURE COMMUNICATION NETWORK SETUP IN A WIRELESS LOCAL AREA NETWORK (WLAN)

CROSS-REFERENCE TO RELATED APPLICATIONS/INCORPORATION BY REFERENCE

This application makes reference to, claims priority to, and claims the benefit of: U.S. Provisional Application Ser. No. 60/602,396 filed Aug. 18, 2004; and U.S. Provisional Application Ser. No. 60/671,120 filed Apr. 14, 2005.

This application makes reference to:
U.S. application Ser. No. 11/207,302 filed Aug. 18, 2005;
U.S. application Ser. No. 11/207,262 filed Aug. 18, 2005;
U.S. application Ser. No. 11/207,658 filed Aug. 18, 2005;
U.S. application Ser. No. 11/208,081 filed Aug. 18, 2005;
U.S. application Ser. No, 11/208,310 filed Aug. 18, 2005;
U.S. application Ser. No. 11/208,346 filed Aug. 18, 2005;
U.S. application Ser. No. 11/207,661 filed Aug. 18, 2005;
U.S. application Ser. No. 11/207,301 filed Aug. 18, 2005;
U.S. application Ser. No. 11/208,284 filed Aug. 18, 2005; and
U.S. application Ser. No. 11/208,347 filed Aug. 18, 2005.

All of the above referenced applications are hereby incorporated herein by reference in their entirety.

FIELD OF THE INVENTION

Certain embodiments of the invention relate to wireless network communication. More specifically, certain embodiments of the invention relate to an architecture for supporting secure communication network setup in a wireless local area network (WLAN).

BACKGROUND OF THE INVENTION

Currently, with some conventional systems, setting up a wireless network generally requires significant interaction and technical knowledge on the part of a user setting up the network, especially when the user is configuring security options for the network. For computer savvy users, the tasks associated with setting up a wireless network can be time consuming. However, for inexperienced computer users, the tasks associated with setting up a wireless network can be more challenging and consumes significantly greater time than required by computer savvy users.

In general, 802.11-based networks require a significant amount of user interaction during the configuration process. Typically, with conventional 802.11-based networks, the user needs to configure a station (STA) to associate to an access point (AP), which may require a number of settings to be selected on the STA, and some knowledge of the default configuration of the AP. The user may then access an HTML-based menu on the new AP in order to set various configuration parameters, many of which are difficult for novice and for intermediate users to understand and set correctly. New APs generally start with a configuration that provides no network security, and which utilize a default network name (SSID) that is selected by the manufacturer such as, for example, "Manufacturer Name", "Default", or "wireless". With the proliferation of 802.11 networks, users often experience confusion and network problems when their new AP uses the same SSID as a neighboring AP. Mechanisms that simplify the tasks associated with the configuration process may reduce the time and/or the cost of setting up and/or expanding a wireless network.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in an architecture for supporting secure communication network setup in a wireless local area network (WLAN) substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
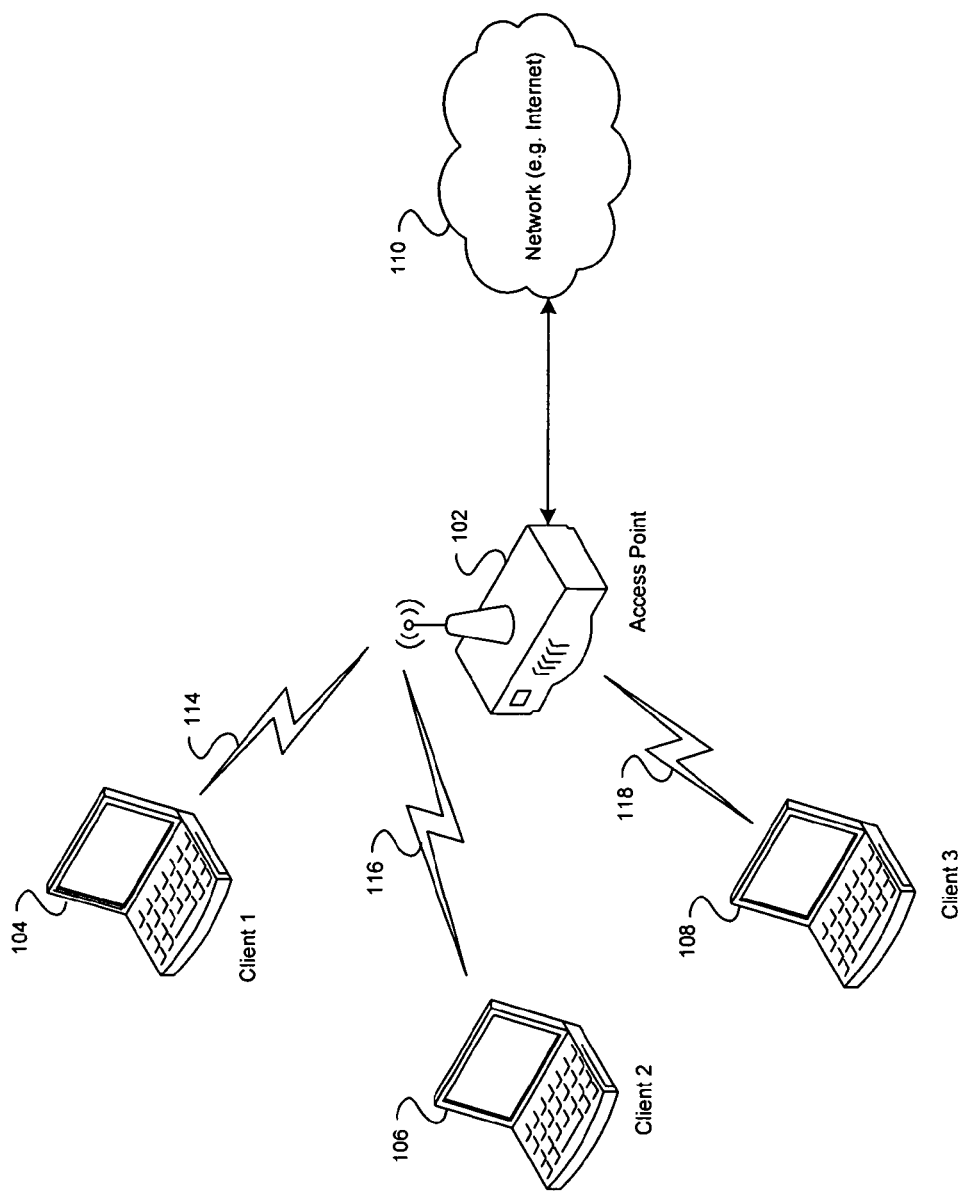
FIG. 1A is a block diagram of an exemplary wireless network, which may be utilized in connection with an embodiment of the invention.

Certain embodiments of the invention may be found in a architecture for supporting secure communication network setup in a wireless local area network (WLAN). The architecture may be utilized in a configurator station or in a client station for establishing a secure communication setup between the client station and the corresponding WLAN. The architecture may comprise an input interface that may be configured by a user to interface with the user's hardware or software configuration buttons. The architecture may also comprise a finite state machine (FSM), a packet processor, and a Diffie-Hellman (DH) generator. The packet processor may comprise code that runs on a configurator. The input interface, the FSM, the packet processor, and the DH generator may be associated with the secure communication setup process. The architecture may also comprise interfaces that are adapted to communicate with a wireless driver and/or an Ethernet driver, and interfaces that are adapted to communicate with persistent storage, such as non-volatile ready access memory (NVRAM). The persistent storage may store, for example, configuration information and/or information that may be utilized for configuration.

In IEEE 802.11 WLAN systems, wireless terminal devices, or wireless terminals, for example personal computers or personal digital assistants, may communicate via radio frequency (RF) channels that may be monitored by unauthorized parties at terminal devices that were not intended to participate in the communication. In response, IEEE 802.11 provides specifications that enable wireless terminal devices to communicate utilizing encryption techniques. The utilization of encryption techniques to securely exchange information between wireless terminals may prevent unauthorized parties from determining the information content carried in communications via a secure RF channel. Prior to being enabled to utilize a WLAN, the wireless terminal device may be required to obtain authorization through a process that comprises authentication.

Enabling a wireless terminal device to obtain authorization and to utilize encryption may require a user to manually configure the wireless terminal. This manual configuration may require a user to possess extensive knowledge about the WLAN that may exceed that of a typical WLAN user. An aspect of the invention may comprise a method that minimizes user interaction and knowledge required to configure a wireless terminal for secure communications in an IEEE 802.11 WLAN. Components in a system, in accordance with an embodiment of the invention, may comprise a configurator, which may alternatively be referred to as a configurator terminal, configurator device, or configurator station, and a client, which may be alternatively referred to as a client terminal, client device, or client station. A configurator station, or a client station, may be referred to as a station.

The configurator may be a wireless and/or wired terminal device, an Ethernet switching device, or other device in an IEEE 802 local area network (LAN) and/or WLAN. The configurator may be located in an access point, for example. The configurator may provide a service to configure clients, which may be wireless terminal devices, thereby enabling the configured clients to utilize secure RF channels with little interaction required from the user. The client may be a wireless and/or wired terminal device, an Ethernet switching device, or other device in an IEEE 802 LAN and/or WLAN.

FIG. 1A is a block diagram of an exemplary wireless network, which may be utilized in connection with an embodiment of the invention. Referring to FIG. 1A, there is shown an access point (AP) 102, and a plurality of client stations (STA) 104, 106, and 108, a plurality of RF channels 114, 116, and 118, and a network 110. The AP 102 may comprise a configuration function and as such may be utilized as a configurator and/or and AP. The STAs 104, 106, and 108 may be wireless terminals such as a PC, a laptop, or a PDA with integrated or plug-in 801.11 capabilities. For example, the PC may utilize a wireless NIC card and the laptop or PDA may comprise integrated 801.11 capabilities. The network 110 may be a private or public network, for example, a service provider or the Internet.

In operation, in instances where the STAs 104, 106, and 108 are configured, they may communicate with the AP 102 via corresponding secure RF channels 114, 116, and 118, respectively. The AP 102 may communicate information received from a configured STA 104, 106, or 108 via the Internet 110. In instances where the STAs 104, 106, or 108 are unconfigured, they may communicate with the configurator 102 to request configuration information. The configurator 102 may configure a requesting STA 104, 106, or 108 via a corresponding RF channel 114, 116, or 118.

In general, the AP 102 may be adapted to facilitate the registration and/or authentication of client stations so that the client stations may become associated with the AP 102 in secure communications network. Various embodiments of the invention may comprise software that executes in the AP 102 and/or client station 104 in order to facilitate registration and/or authentication. The software may enable the AP 102 to register client stations 104 in a secure communications network. An AP 102 may register a client station 104 by storing information, for example a media access control (MAC) address or an Internet protocol (IP) address, associated with the client station 104. Registration may also comprise configuration of the client station 104 by the AP 102.

An AP 102 may configure a client station 104 by performing software configuration tasks that enable the client station 104 to communicate information to another STA 106 in a secure communications network. In one embodiment of the invention, exemplary software configuration tasks may comprise generating a passphrase at an AP 102 and communicating the passphrase securely, to the client station 104. The passphrase may be utilized to encrypt information communicated by STAs in a secure communications network. The secure communications network may comprise the AP 102, and one or more client stations such as client station 104, that are configured by the AP 102. A system for secure automatic registration in a communications network may comprise an access point 102 that registers a client device 104 without requiring that software configuration tasks be performed by an end user. In this regard, an end user does not have to manually enter configuration information on the AP 102 and/or the client station 104 in order to register and authenticate the client station 104.

In various embodiments of the invention, activating a hardware button and/or software button may register a client station 104 with an AP 102. This may comprise activating a hardware and/or software enabled button located on an AP 102, and by activating a hardware and/or software enabled button located on a client station 104. A hardware button may comprise a physical button that may be dedicated to performing a function related to automatic registration security. A software enabled button may comprise a software icon that appears on a user interface. A hardware button and/or software enabled button may be activated as a result of a method of physical action on the part of a user. Activation of a hardware and/or software enabled button located on an AP 102, and subsequent activation of a hardware and/or software enabled button located on a client station 104, may result in a registering of the client station 104 with the AP 102. The client station 104 may also be configured, by the AP 102, to communicate information in a secure communications network.

Some IEEE 802.11 WLANs utilize a technology for network security based on Wi-Fi protected access (WPA), or second generation WPA (WPA2). For example, configuration parameters, such as a passphrase or SSID, may require manual entry by a user at an AP 102 and/or at a client station 104 in some conventional WPA-based WLANs. In various embodiments of the invention, in order to provide support for WPA, the passphrase and/or SSID may be generated by an AP 102, and entered at a client station 104, by activating a hardware and/or software enabled button located on an AP 102, and/or located on a client station 104. Subsequent to configuration, in accordance with various embodiments of the invention, the configured client station 104 may communicate information in a WPA-based WLAN. A client station 104, which is configured with a passphrase and/or SSID in accordance with various embodiments of the invention, may communicate in a secure communication network with a WLAN station 106, for which the passphrase and/or SSID were not configured in accordance with various embodiments of the invention. For example, the passphrase and SSID may be configured at the WLAN station 106 as a result of manual entry by a user.

Figure 1B:
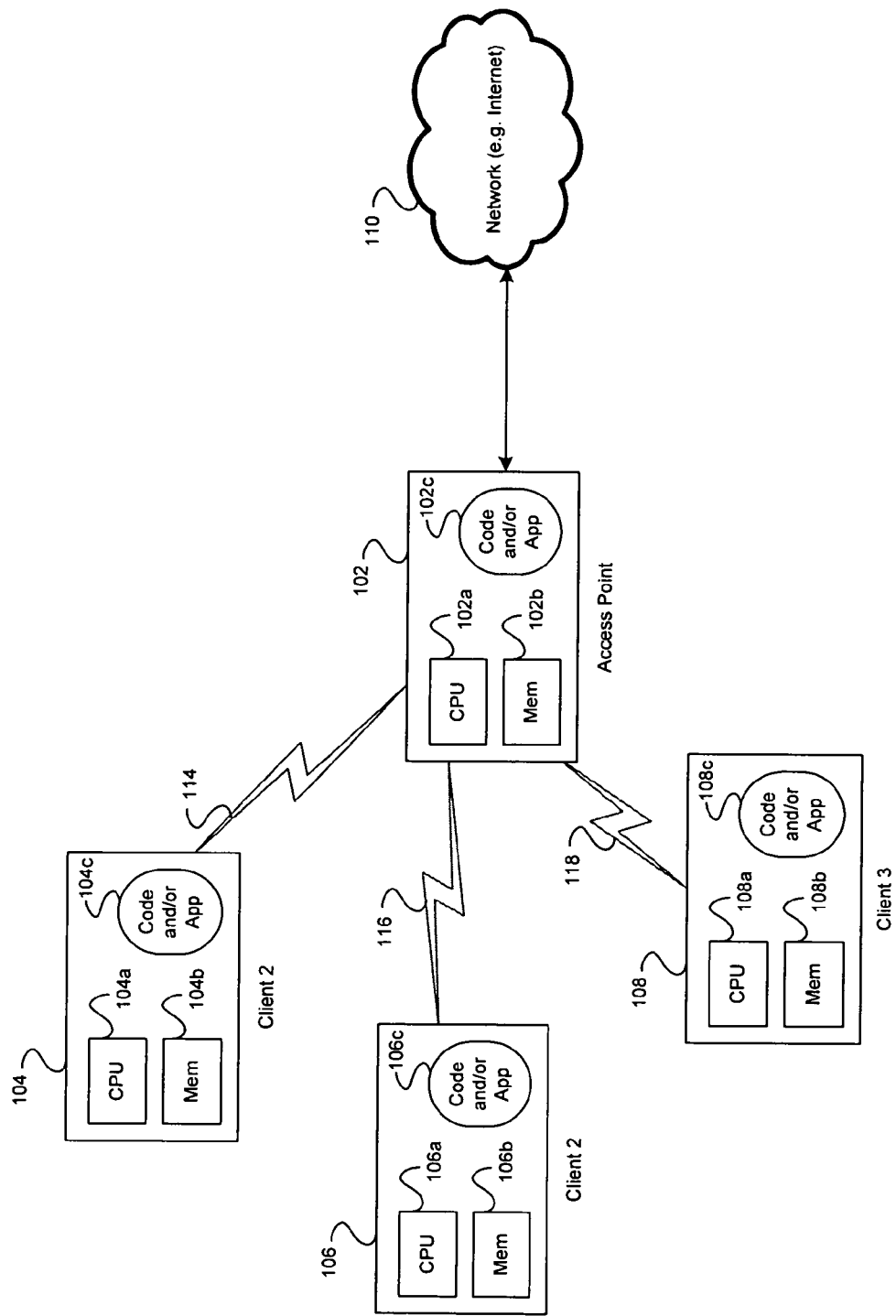
FIG. 1B is a block diagram of a software environment in an exemplary wireless network, which may be utilized in connection with an embodiment of the invention.

FIG. 1B is a block diagram of a software environment in an exemplary wireless network, which may be utilized in connection with an embodiment of the invention. Referring to FIG. 1B, there is shown an access point (AP) 102, and a plurality of client stations (STA) 104, 106, and 108, a plurality of RF channels 114, 116, and 118, and a network 110. The AP 102 may further comprise a central processing unit (CPU) 102a, system memory 102b, and code and/or application software 102c. The STA 104 may further comprise a CPU 104a, system memory 104b, and code and/or application software 104c. The STA 106 may further comprise a CPU 106a, system memory 106b, and code and/or application software 106c. The STA 108 may further comprise a CPU 108a, system memory 108b, and code and/or application software 108c. The AP 102, and the STAs 104, 106 and 108 may be substantially as described in FIG. 1a.

The CPU 102a, 104a, 106a or 108a may be adapted to perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. The system memory 102b, 104b, 106b or 108b may comprise suitable logic, circuitry, and/or code to be utilized to store, or write, and retrieve, or read, information. It may comprise a plurality of memory technologies such as random access memory (RAM). The code and/or application software 102c, 104c, 106c or 108c may comprise a computer program.

In operation, the system memory 102b may comprise machine-readable storage having stored thereon at least one code section for enabling communication of information in a secure communication system. The at least one code section may be executable by the CPU 102a. The at least one code section may cause the CPU 102a to perform steps related to registering and configuring a client station 104 with the AP 102.

In operation, the system memory 104b, 106b or 108b may comprise machine readable storage having stored thereon at least one code section for enabling communication of information in a secure communication system. The at least one code section may be executable by the CPU 104a, 106a or 108a, respectively. The at least one code section may cause the CPU 104a, 106a or 108a to perform steps related to requesting registration and configuration of the client station 104, 106 or 108 with the AP 102.

Figure 2:
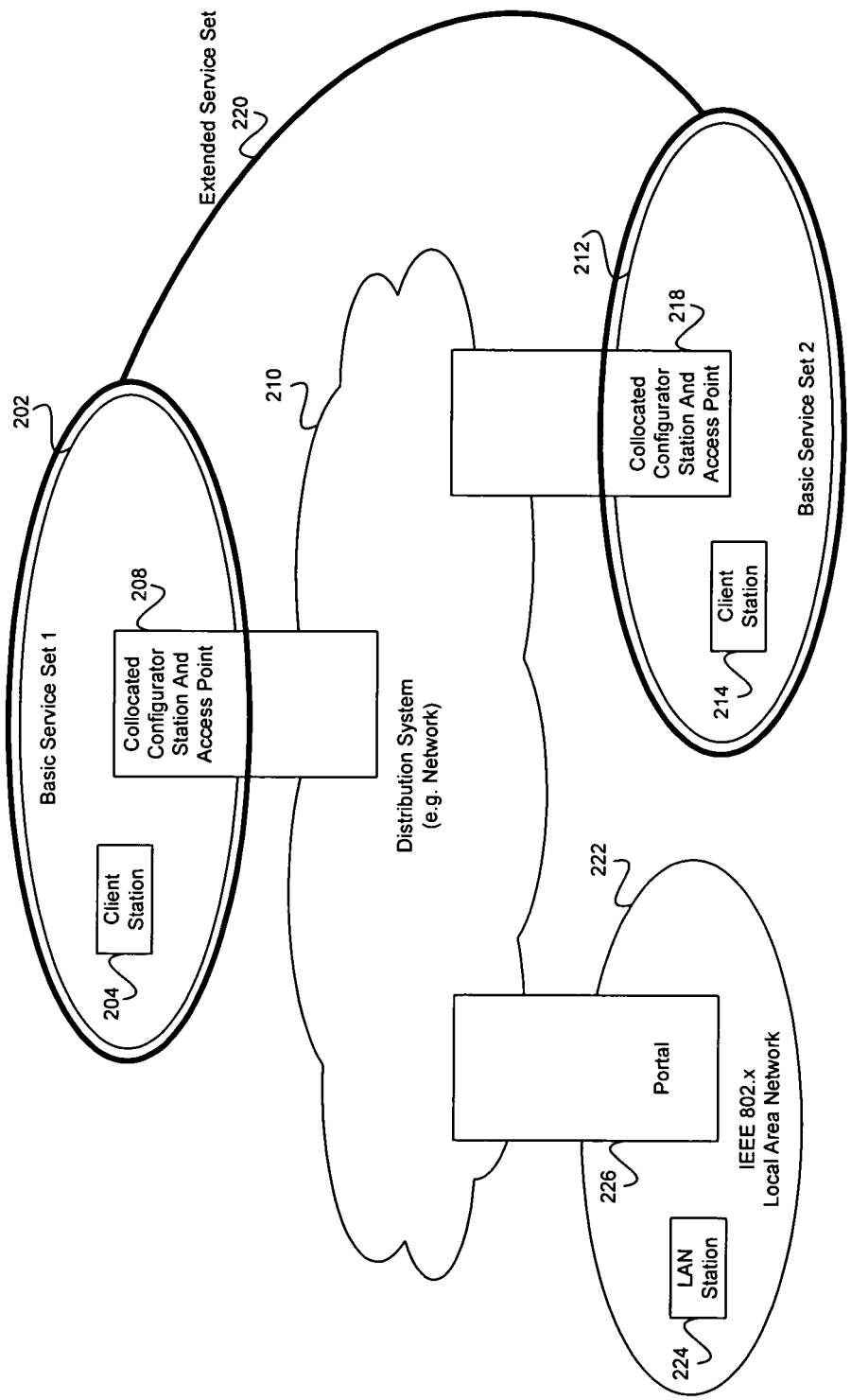
FIG. 2 is a block diagram of an exemplary system for wireless data communications comprising an ESS with collocation of configurators and access points (AP), in accordance with an embodiment of the invention.

FIG. 2 is a block diagram of an exemplary system for wireless data communications comprising an ESS with collocation of configurators and access points (AP), in accordance with an embodiment of the invention. With reference to FIG. 2a there is shown a distribution system (DS) 210, an extended service set (ESS) 220, and an IEEE 802 LAN 222. The ESS 220 may comprise a first basic service set (BSS) 202, and may include a second BSS 212, and may also include additional BSSs. The first BSS 202 may comprise a client station 204, and a collocated configurator station and access point 208. The second BSS 212 may comprise a client station 214, and a collocated configurator station and access point 218. The IEEE 802 LAN 222 may comprise a LAN station 224, and a portal 226.

The collocated configurator station and access point 208 may be adapted to function as an access point or as a configurator station. Throughout this application, for simplicity, collocated configurator station and access point 208 may be referred to as collocated device 208. Accordingly, the collocated device 208 functioning as an access point refers to the collocated configurator station and access point 208 functioning as an access point. Additionally, the collocated device 208 functioning as a configurator refers to the collocated configurator station and access point 208 functioning as a configurator.

A BSS 202 may comprise a plurality of proximately located stations that may communicate wirelessly, via a wireless medium. A BSS 202 that is also associated with an ESS 220 may be referred to an infrastructure BSS. The wireless medium may comprise an RF channel. The ESS 220, comprising a plurality of BSS 202 and 212, for example, may be identified by a unique service set identifier (SSID). The portal 226 may also be a member in the ESS 220. Stations 204 and 214, associated with an ESS 220, may communicate via a wireless medium and/or via a distribution system medium, for example the DS 210. The DS 210 may comprise a distribution system medium that further comprises a wired medium and/or a wireless medium. A wired medium may comprise a physical communications channel that enables STA 204 to transmit information via a plurality of communications technologies, for example electrical or optical signals. In an IEEE 802.11 WLAN, the collocated configurator station and access point 208 or 218 may comprise the functionality of an AP and the functionality of a configurator. In an IEEE 802.11 WLAN, an AP may comprise the functionality of a station.

The collocated device 208 functioning as an AP, may enable STA 204 to transmit information via the DS 210. Portal 226 may enable a LAN station 224, which is located in a traditional IEEE 802 LAN, to communicate with an IEEE 802.11 STA 204, via the DS 210. A traditional IEEE 802 LAN may comprise a wired medium. An IEEE 802 LAN 222 may not comprise an IEEE 802.11 WLAN, for example BSS 202. The DS 210 may utilize media access control (MAC) layer IEEE 802 addressing and/or network layer addressing. If the DS 210 utilizes MAC layer IEEE 802 addressing, the collocated device 208 functioning as an AP, collocated configurator station and access point 218 functioning as an AP, and/or the portal 226 may comprise Ethernet switching device functionality. If the DS 210 utilizes network layer addressing, the collocated device 208 functioning as an AP, collocated configurator station and access point 218 functioning as an AP, and/or the portal 226 may comprise router functionality.

The collocated device 208 functioning as a configurator may configure a STA 204, thereby enabling the STA 204 to communicate wirelessly in a secure IEEE 802.11 network that utilizes encryption. The collocated device 208 functioning as a configurator, may configure a STA 204 by communicating information to the STA 204 comprising an SSID and a passphrase. The SSID and the passphrase may be utilized to generate an encryption key that may also be referred to as a pre-shared key (PSK). A configured STA 204 may be authorized to utilize an IEEE 802.11 network based on the received configuration information from the collocated device 208 functioning as a configurator. A process by which the STA 204 is authenticated may comprise configuration of the STA 204. Various embodiments of the invention comprise a method and a system for configuring the STA 204 while requiring less manual intervention from a user than is the case with some conventional methods and/or systems for configuring the STA 204.

A non-AP station, for example, the client station 204 within the BSS 202 may subsequently form an association with the collocated device 208 functioning as an AP. The STA 204 may communicate an association request to the collocated device 208 functioning as an AP, based on the SSID that was received by the STA 204 during configuration. The collocated device 208 functioning as an AP, may communicate an association response to the STA 204 to indicate to the STA 204 indicate the result of the association request. By associating with the collocated device 208 functioning as an AP, the station 204 may become a member of BSS 202. Furthermore, by obtaining membership in BSS 202, the STA 204 may become authorized to engage in secure wireless communication with other client stations in the ESS 220. Similarly, non-AP client station 214 within a BSS 212 may form an association with the collocated configurator station and access point 218 functioning as an AP, enabling the STA 214 to become a member of BSS 212.

Subsequent to the formation of an association between the client station 204 and the collocated device 208 functioning as an AP, the collocated device 208 functioning as an AP, may communicate accessibility information about the client station 204 to other APs associated with the ESS 220, such as the collocated configurator station and access point 218 functioning as an AP, and portals such as the portal 226. In turn, the collocated configurator station and access point 218 functioning as an AP, may communicate accessibility information about the client station 204 to stations in BSS 212. The portal 226, such as for example an Ethernet switch or other device in a LAN, may communicate reachability information about the client station 204 to stations in LAN 222, such as LAN station 224. The communication of reachability information about the client station 204 may enable stations that are not associated in BSS 202, but are associated in ESS 220, to communicate with the client station 204.

The DS 210 may provide an infrastructure that enables a client station 204 in one BSS 202, which has been authenticated and configured in accordance with various embodiments of the invention, to engage in a secure wireless communication with a client station 214 in another BSS 212. The DS 210 may also enable a client station 204 in one BSS 202 to communicate with a LAN station 224 in a non-802.11 LAN 222, such as a wired LAN. The collocated device 208 functioning as an AP, collocated configurator station and access point 218 functioning as an AP, or portal 226 may provide a facility by which a station in a BSS 202, BSS 212, or LAN 222 may communicate information via the DS 210. The client station 204 in BSS 202 may communicate information to a client station 214 in BSS 212 by transmitting the information to collocated device 208 functioning as an AP. The collocated device 208 functioning as an AP may transmit the information via the DS 210 to the collocated configurator station and access point 218 functioning as an AP, which, in turn, may transmit the information to station 214 in BSS 212. The client station 204 may communicate information to a LAN station 224 in LAN 222 by transmitting the information to collocated device 208 functioning as an AP. The collocated device 208 functioning as an AP, may transmit the information via the DS 210 to the portal 226, which, in turn, may transmit the information to the LAN station 224 in LAN 222.

Figure 3:
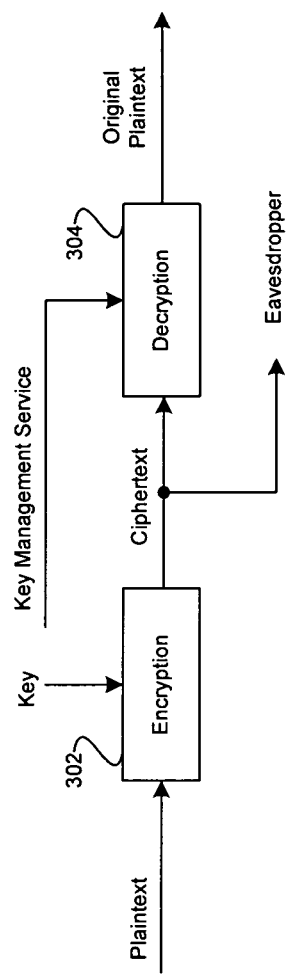
FIG. 3 is a block diagram of an exemplary secure communication system, which may be utilized in connection with an embodiment of the invention.

FIG. 3 is a block diagram of an exemplary secure communication system, which may be utilized in connection with an embodiment of the invention. With reference to FIG. 3, there is shown an encryption block 302, and a decryption block 304. The encryption block 302 may comprise suitable logic, circuitry and/or code that may be adapted to encrypt received information based on a key provided by a key management service. The decryption block 304 may comprise suitable logic, circuitry and/or code that may be adapted to decrypt received information based on a key provided by a key management service. The encryption block 302 may be adapted to encrypt, or code data so as to hide the information content from an unauthorized eavesdropper who monitors a communication channel over which the information is communicated. This encryption may enable users of WLAN systems to obtain a level of privacy in communications, which approximates that realized in wired LAN systems. Prior to transmission via an RF channel, unencrypted data, or plaintext, may be processed by the encryption block 302 into encrypted data, or ciphertext, based on a key. Information comprising the ciphertext may be securely transmitted via an RF channel. An eavesdropper may be unable to extract the plaintext from the ciphertext without gaining access to the key that was utilized to generate the ciphertext from the plaintext.

Information received via a secure RF channel may be processed by the decryption block 304, which may retrieve the original plaintext from the received ciphertext based on a key. Various embodiments of the invention may comprise a key management service that provides a mechanism by which the encryption block 302 and the decryption block 304 may utilize a common key that may be referred to as a passphrase. A station, for example, a client station 204, may comprise at least one of an encryption block 302 and/or decryption block 304.

Figure 4:
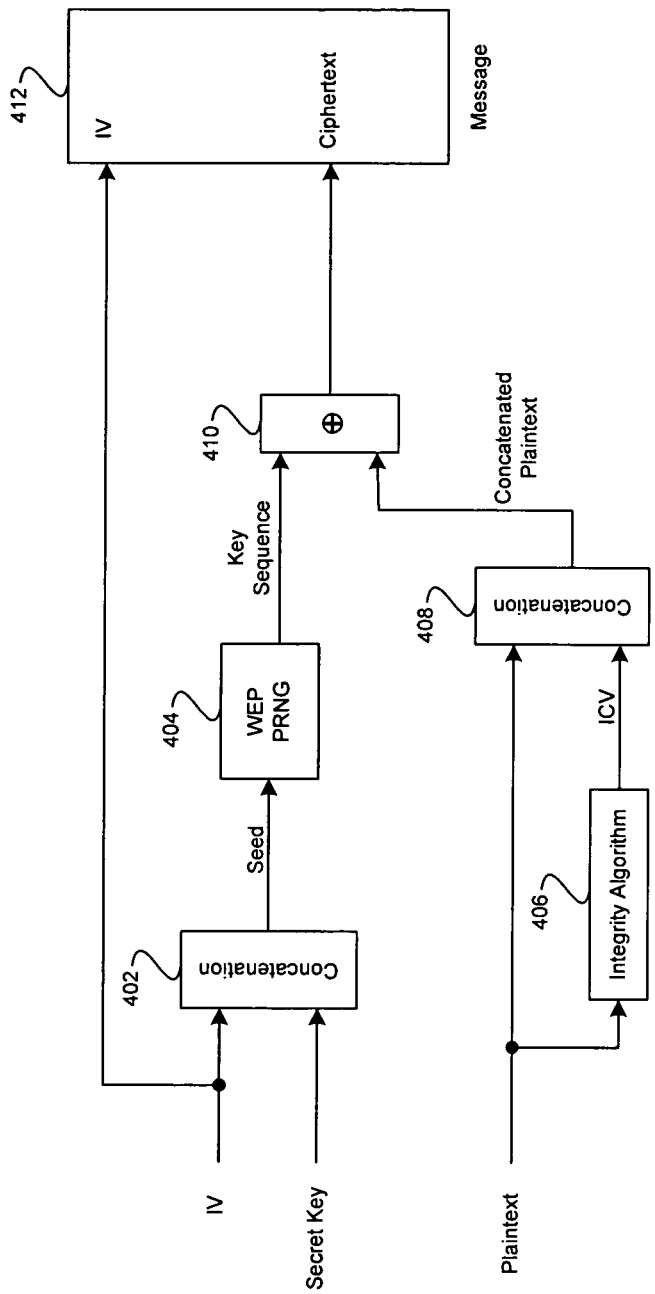
FIG. 4 is a block diagram of an exemplary encryption system, which may be utilized in connection with an embodiment of the invention.

FIG. 4 is a block diagram of an exemplary encryption system, which may be utilized in connection with an embodiment of the invention. With reference to FIG. 4 there is shown a concatenation block 402, a pseudo random number generator (PRNG) block 404, an integrity algorithm block 406, a concatenation block 408, a logical exclusive-or block 410, and a message block 412.

The concatenation block 402 may comprise suitable logic, circuitry and/or code that may be adapted to receive input comprising an initialization vector (IV), and a secret key. The IV and secret key may be processed by the concatenation block 402 to generate a seed. The PRNG block 404 may comprise suitable logic, circuitry and/or code that may be adapted to generate a key sequence based on a received seed. The integrity algorithm block 406 may comprise suitable logic, circuitry and/or code that may be adapted to process received plaintext to generate an integrity check value (ICV). The concatenation block 408 may process received plaintext and ICV to produce concatenated plaintext. The logical exclusive-or block 410 may process concatenated plaintext and a key sequence to produce ciphertext. The message block 412 may process received IV and ciphertext to generate information, which may be transmitted via an RF channel in a secure communication.

In various embodiments of the invention, the secret key, also referred to as a passphrase, may comprise an encryption key that, in turn, comprises a portion of configuration information that is communicated from a collocated device 208 functioning as a configurator, to a client station 204 during authentication of the client station 204. The IV may change periodically. The concatenation block 402 may receive an IV and a passphrase from a station 204 that transmits information via an RF channel. The PRNG block 404 may receive a seed from the concatenation block 402. The integrity algorithm block 406 may receive plaintext from a station that transmits information via an RF channel. The concatenation block 408 may receive an ICV from the integrity algorithm block 406, and plaintext from a station 204 that transmits information via an RF channel. The logical exclusive-or block 410 may receive a key sequence from the PRNG block 404, and concatenated plaintext from the concatenation block 408. The message block 412 may receive ciphertext from the logical exclusive-or block 410 and an IV from a station 204 that transmits information via an RF channel. An encryption block 302 may comprise a concatenation block 402, a PRNG block 404, an integrity algorithm block 406, a concatenation block 408, a logical exclusive-or block 410, and/or a message block 412.

Figure 5:
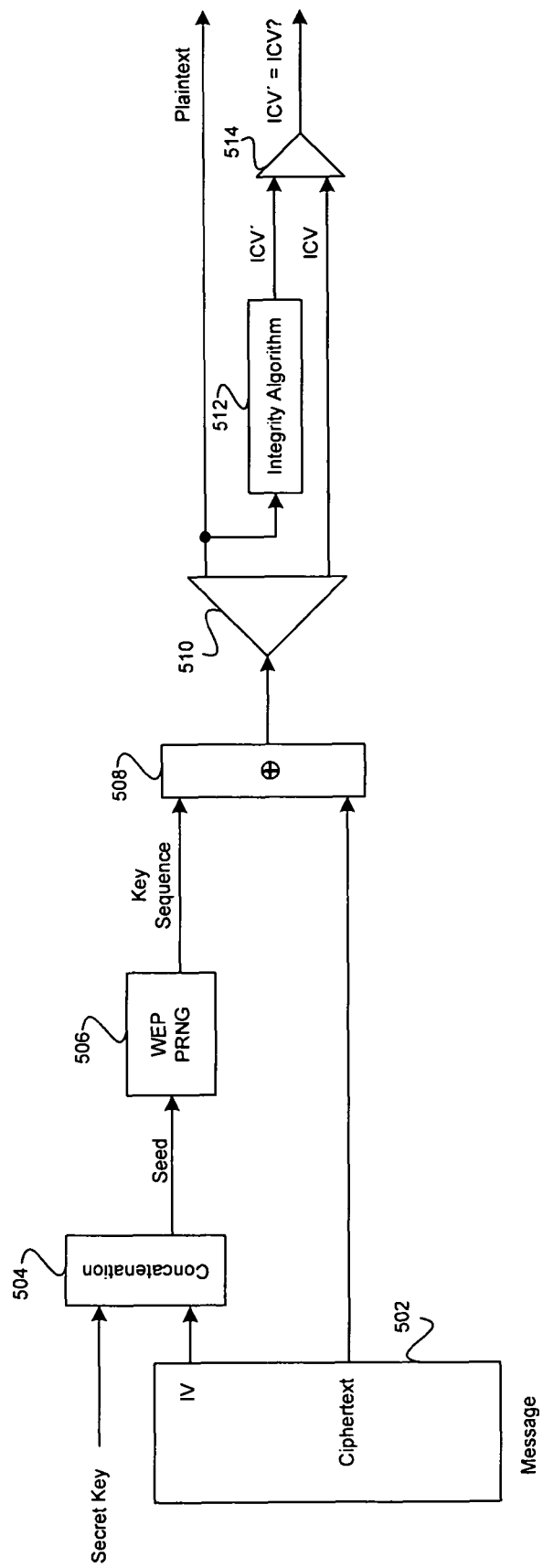
FIG. 5 is a block diagram of an exemplary decryption system, which may be utilized in connection with an embodiment of the invention.

FIG. 5 is a block diagram of an exemplary decryption system, which may be utilized in connection with an embodiment of the invention. With reference to FIG. 5, there is shown a message block 502, a concatenation block 504, a PRNG block 506, a logical exclusive-or block 508, a splitter block 510, an integrity algorithm block 512, and a combiner block 514. The message block 502 may process received information, separating the received information into constituent components comprising ciphertext and IV. The concatenation block 504 may process received IV and secret key to generate a seed. The PRNG block 506 may process a received seed to generate a key sequence. The logical exclusive-or block 508 may process received key sequence and ciphertext to decrypt the ciphertext. The splitter block 510 may process received information, separating the received information into constituent components comprising ICV and plaintext. The integrity algorithm block 512 may generate an ICV' based on received plaintext. The combiner block 514 may compare a received ICV' and ICV. The combiner block 514 may generate an output which indicates whether ICV'=ICV is true or false.

In operation the secret key may have been distributed to the concatenation block 504 utilizing a key management service. The message block 502 may receive information received by a station via an RF channel. The concatenation block 504 may receive an IV from the message block 502. The PRNG block 506 may receive a seed from the concatenation block 504. The logical exclusive-or block 508 may receive the key sequence from the PRNG block 506, and the ciphertext from the message block 502. The splitter block 510 may receive information from the logical exclusive-or block 508. The integrity algorithm block 512 may receive plaintext from the splitter block 510. The combiner block 514 may receive ICV from the splitter block 510, and ICV' from the integrity algorithm block 512. If the combiner block 514 generates an output indicating false, the received information may be determined to be in error and discarded by a station 204 that received the information via an RF channel. A decryption block 304 may comprise at least one of a message block 502, a concatenation block 504, a PRNG block 506, a logical exclusive-or block 508, a splitter block 510, an integrity algorithm block 512, and a combiner block 514.

Various embodiments of the invention may not be limited to a specific method of encryption. Accordingly, various embodiments of the invention may utilize a plurality of encryption techniques such as wired equivalent privacy (WEP), the Temporal Key Integrity Protocol (TKIP) or the Counter Mode with CBC-MAC Protocol (CCMP).

Figure 6A:
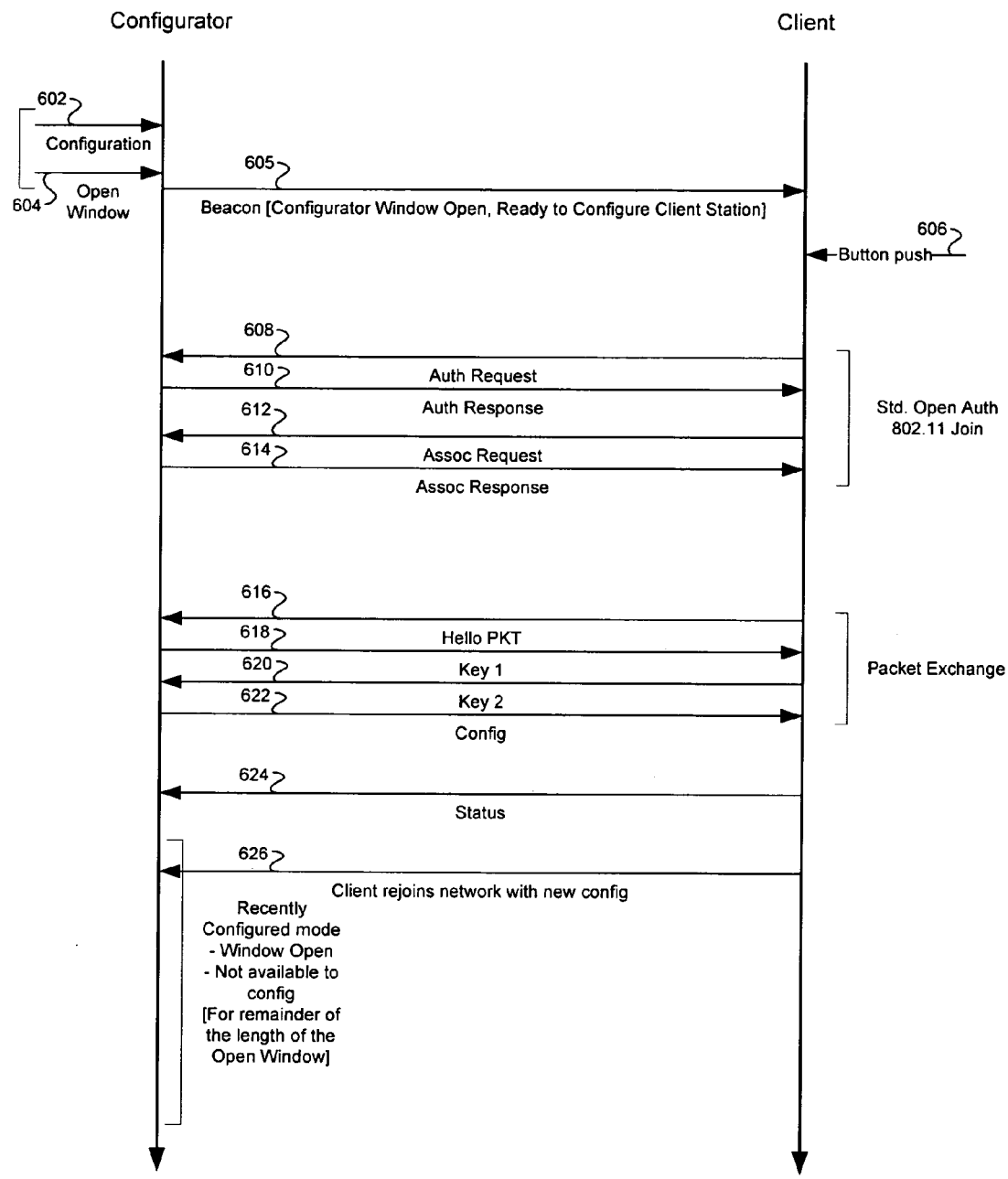
FIG. 6A is a diagram illustrating exemplary message exchanges based on a protocol and initiated at the configurator, in accordance with an embodiment of the invention.

FIG. 6A is a diagram illustrating exemplary message exchanges based on a protocol and initiated at the configurator, in accordance with an embodiment of the invention. FIG. 6A presents an exemplary exchange of messages between the collocated device 208 functioning as a configurator, and the client station 204, based on the protocol. In step 602, the collocated device 208 functioning as a configurator, may be configured. A collocated device 208 functioning as a configurator, which is not configured to supply configuration information to a requesting client station 204 during authentication may be referred to as an unconfigured collocated device 208 functioning as a configurator. In an unconfigured collocated device 208 functioning as a configurator, activation of a button located thereon for a specified time duration may initiate step 602. The time duration for which the button is activated may correspond to, for example, a "short" button activation. In instances where the collocated device 208 functions as a configurator, configuration may comprise entering an SSID, and/or entering a passphrase. The SSID and/or passphrase that is entered and/or generated during the configuration may subsequently be utilized when configuring client stations 204. If a passphrase is not entered, the configurator may be adapted to generate one, which may subsequently be utilized to configure client stations 204. The entered and/or generated configuration information may be stored in non-volatile memory, and/or in a storage device at the collocated device 208, for example. When the collocated device 208 functions as a configurator, it may retrieve the configuration information from the non-volatile memory and/or storage device and use it to configure client stations 204.

In a configured collocated device 208, functioning as a configurator, activation of the button thereon for a specific time duration may result in step 602 being bypassed, and step 604 initiated. The specific time duration for which the button is activated may correspond to, for example, a short button activation. In step 604, a configurator timing window or configurator registration window may be opened at the collocated device 208 functioning as a configurator. The opening of the configurator timing window may correspond to the start of a time duration during which a client station 204 may be configured by the collocated device 208 functioning as a configurator. The time during which the configurator timing window remains open subsequent to a short button activation may be configured at the collocated device 208 functioning as a configurator.

In step 605, at a time instant subsequent to the opening of the configurator timing window in step 604, the collocated device 208 functioning as an AP, may transmit IEEE 802.11 beacon frames comprising authentication enablement information, in accordance with an embodiment of the invention. The authentication enablement information may indicate that the configurator timing window is open, and that the collocated device 208 functioning as a configurator is ready to configure a client station 204. In one embodiment of the invention, the authentication enablement information may comprise a flag field, window_open, which may be set to a Boolean value to indicate whether the configurator timing window is open or closed. A logical value window_open=TRUE, or a numerical value window_open=1 may indicate that the configurator timing window is open, for example. A logical value window_open=FALSE, or a numerical value window_open=0 may indicate that the configurator timing window is closed, for example. The authentication enablement information may comprise a flag field, recently_cfg, which may be set to a Boolean value to indicate whether the collocated device 208 functioning as a configurator, is ready to configure a client station 204. A logical value recently_cfg=FALSE, or a numerical value recently_cfg=0 may indicate that the collocated device 208 functioning as a configurator, is ready to configure a client station 204, for example. A logical value recently_cfg=TRUE, or a numerical value recently_cfg=1 may indicate that the collocated device 208 functioning as a configurator, has already configured a client station 204 during the current configurator timing window open time interval and is not ready to configure a client station 204, for example.

At a time instant when a configurator timing window is opened, a subsequent first beacon message, associated with the step 605, transmitted by the collocated device 208 functioning as a configurator. The message, associated with the step 605, may comprise flags window_open=TRUE, indicating that the configurator timing window is open, and recently_cfg=FALSE, indicating that the collocated device 208 functioning as a configurator, is ready to configure a client station 204. Beacon frames transmitted by the collocated device 208 functioning as an AP, at instants in time during which the configurator timing window is not open may not comprise authentication enablement information. In step 605, these beacon frames may be received by a client station 204.

In a client station 204, activation of the button, located at a client station 204 may initiate step 606. In step 606, a client timing window may be opened at the client station 204. The opening of the client timing window may correspond to the start of a time duration in which a client station 204 may request to be configured by the collocated device 208 functioning as a configurator. The client station 204 may also start a discovery protocol. The discovery protocol comprises a process by which a client station 204 may locate a collocated device 208 functioning as a configurator, with which to initiate an authentication exchange. The client station 204 may scan beacon frames received from one or more collocated devices 208 functioning as either a configurator or an access point. A beacon frame collocated device 208 functioning as a configurator may comprise authentication enablement information. Subsequent to the opening of the client timing window, the client station 204 may communicate authentication response information to the collocated device 208 functioning as a configurator, via one or more messages associated with the steps 608, 612, 616, 620 and 624. The client station 204 may communicate the one or more messages, associated with the steps 608, 612, 616, 620 and 624, comprising authentication response information based on authentication enablement information contained in the transmitted beacon frame during a time interval in which the configurator timing window was open.

A button located at either the collocated device 208 functioning as a configurator, or the client station 204, may comprise a hardware button, for example a physical button, and/or a software enabled button, for example, a glyph or icon that is displayed in a user interface.

Steps 608, 610, 612, and 614 may comprise message exchanges based on IEEE 802.11 comprising an open authentication and join of a basic service set (BSS) as defined in IEEE 802.11. The BSS utilized during open authentication may utilize a different SSID than that utilized by the infrastructure BSS 202. In step 608, an authentication request message may be sent by the client station 204, to the collocated device 208 functioning as a configurator. In step 610, the collocated device 208 functioning as a configurator, may send an authentication response message to the client station 204. In step 612, the client station 204 may send an association request message, associated with the step 612, to the collocated device 208 functioning as a configurator. In step 614, the collocated device 208 functioning as a configurator, may send an association response message, associated with the step 614, to the client station 204.

Steps 616, 618, 620, and 622 may comprise a packet exchange based on the protocol, in accordance with various embodiments of the invention. The packet exchange may utilize, but may not be limited to, the Diffie-Hellman (DH) protocol. In step 616, the client station 204 may communicate a hello packet to the collocated device 208 functioning as a configurator. The hello packet, associated with the step 616, may indicate to the collocated device 208 functioning as a configurator, that the client station 204 is ready to be configured. In step 618, the collocated device 208 functioning as a configurator, may communicate a key 1 message to the client station 204. The key 1 message, associated with the step 618, may comprise a configurator key. In step 620, the client station 204 may communicate a key 2 message to the collocated device 208 functioning as a configurator. The key 2 message, associated with the step 620, may comprise a client key.

In step 622, the collocated device 208 functioning as a configurator, may communicate a configuration message to the client station 204. The configuration message, associated with the step 622, may comprise configuration information that may be utilized to authenticate a client station 204. The configuration information communicated in the configuration message, associated with the step 622, may be encrypted based on the configurator key and/or the client key. In step 624, the client station 204 may communicate a status message to the collocated device 208 functioning as a configurator. The status message 624 may be sent subsequent to decryption of at least a portion of the configuration message 622. The client station 204 may utilize the configurator key and/or the client key to decrypt at least a portion of the configuration message, associated with the step 622, that was previously encrypted by the collocated device 208 functioning as a configurator. The status message, associated with the step 624, may indicate whether the client station 204 was successfully configured during the packet exchange. If the client station was successfully configured, the status message, associated with the step 624, may indicate success. The collocated device 208 functioning as a configurator, may store authentication information about the configured client 204 in persistent memory. Persistent memory may comprise any of a plurality of device storage technologies that may be utilized to maintain information about the configured client station 204 until action is taken to release the stored information from persistent memory. These actions may comprise manual intervention at the collocated device 208 functioning as a configurator, by a user, or automatic intervention by a software process executing at the configurator.

In step 626, the client station 204 may rejoin the WLAN based on the received configuration information. The steps performed during the rejoin, associated with the step 626, may be substantially as defined in IEEE 802.11. The rejoin, associated with the step 626, may occur via a secure RF channel that utilizes the received configuration information in step 622. For example, the rejoin, associated with the step 626, may utilize the SSID that was received by the client station during the packet exchange. Subsequent to configuration of the client station 204, the collocated device 208 functioning as a configurator, may not be available to configure another client station 106 during the current configurator registration window time interval. Beacon frames may be transmitted by the collocated device 208 functioning as an AP, subsequent to the configuration of the client station 204. These beacon frames may comprise information that indicates that the configurator timing window is closed, and that the collocated device 208 functioning as a configurator, has already configured a client station 204 during the current configurator timing window open time duration. This may indicate to a subsequent client station 204 that receives the beacon frames that the collocated device 208 functioning as a configurator, is not currently ready to configure a client station 204.

In various embodiments of the invention, the packet exchange, comprising the steps 616, 618, 620, 622 and 624, may be performed by a collocated device 208 functioning as a configurator, and a client station 204 that communicate wirelessly, via a wireless medium. The collocated device 208 functioning as a configurator, and client station 204 may also communicate during the packet exchange via a wired medium, for example, via an Ethernet LAN 222. If the collocated device 208 functioning as a configurator, receives a packet, for example an authentication request, associated with the step 608, from the client station 204, via a wireless medium, subsequent packet exchanges between the collocated device 208 functioning as a configurator, and client station 204 may be communicated wirelessly. If the collocated device 208 functioning as a configurator receives a packet from the client station 204, via a wired medium, subsequent packet exchanges between the collocated device 208 functioning as a configurator, and client station 204 may be communicated via a wired medium. The received packet may be, for example, a hello packet, associated with the step 616.

In operation, if the time duration for button activation at the collocated device 208 functioning as a configurator, corresponds to a "long" button activation, the collocated device 208 functioning as a configurator, may generate a new SSID and/or passphrase. The new SSID and/or passphrase may replace an SSID and/or passphrase that was stored in the collocated device 208 functioning as a configurator, as configuration information prior to the long button activation. For either a configured, or unconfigured collocated device 208 functioning as a configurator, a long button activation may initiate step 602. Subsequent to a long button activation, the configurator may also release, from persistent memory, configuration information pertaining to previously configured client stations 204. As a consequence, previously configured client stations 204 may lose the ability to engage in secure wireless communications via the BSS 202 or ESS 220. The client stations 204 may be required to repeat the process of authentication with a collocated device 208 functioning as a configurator, to regain the ability to engage in secure wireless communications via the BSS 202 or ESS 220.

The exchange of authentication enablement information, authentication response information and configuration information in messages associated with the steps 605, 608, 610, 612, 614, 616, 618, 620, 622 and 624, between a collocated device 208 functioning as a configurator, and a client station 204, may occur within a time duration in which the configurator timing window is open. The configurator timing window is closed after a time interval corresponding to a configurator timing window open duration lapses or ends. The exchange of authentication enablement information, authentication response information and configuration information, in messages associated with the steps 605, 608, 610, 612, 614, 616, 618, 620, 622 and 624, between a collocated device 208 functioning as a configurator, and a client station 204, may occur within a time duration in which the client timing window is open. After a time interval corresponding to a client timing window open duration lapses, the client timing window is closed.

Figure 6B:
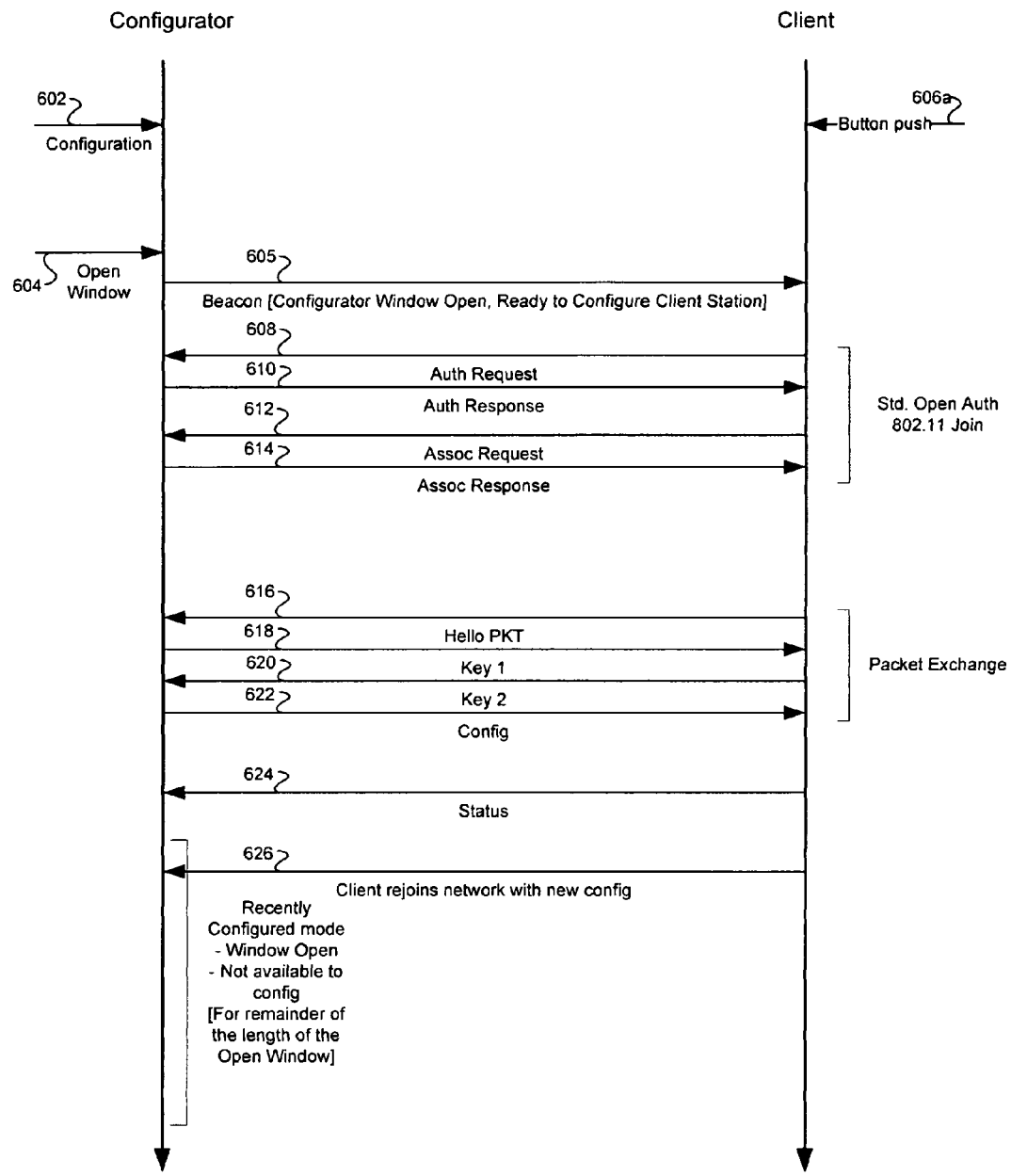
FIG. 6B is a diagram illustrating exemplary message exchanges based on a protocol and initiated at the client station, in accordance with an embodiment of the invention.

FIG. 6B is a diagram illustrating exemplary message exchanges based on a protocol and initiated at the client station, in accordance with an embodiment of the invention. FIG. 6B is substantially as described in FIG. 6A with the exception that the button activation occurs at the client station 204, to open the client timing window, at a time instant prior to a time instant at which the button activation occurs at the collocated device 208 functioning as a configurator, to open the configurator timing window. Subsequent to the button activation to open the client timing window, associated with the step 606a, at the client station 204, the client station 204 may wait to receive a beacon frame, associated with the step 605,. The beacon frame, associated with the step 605, may comprise authentication enablement information from the collocated device 208 functioning as an AP. Subsequent to receiving the beacon frame, message exchanges in FIG. 6B are substantially as described for FIG. 6A.

Figure 7:
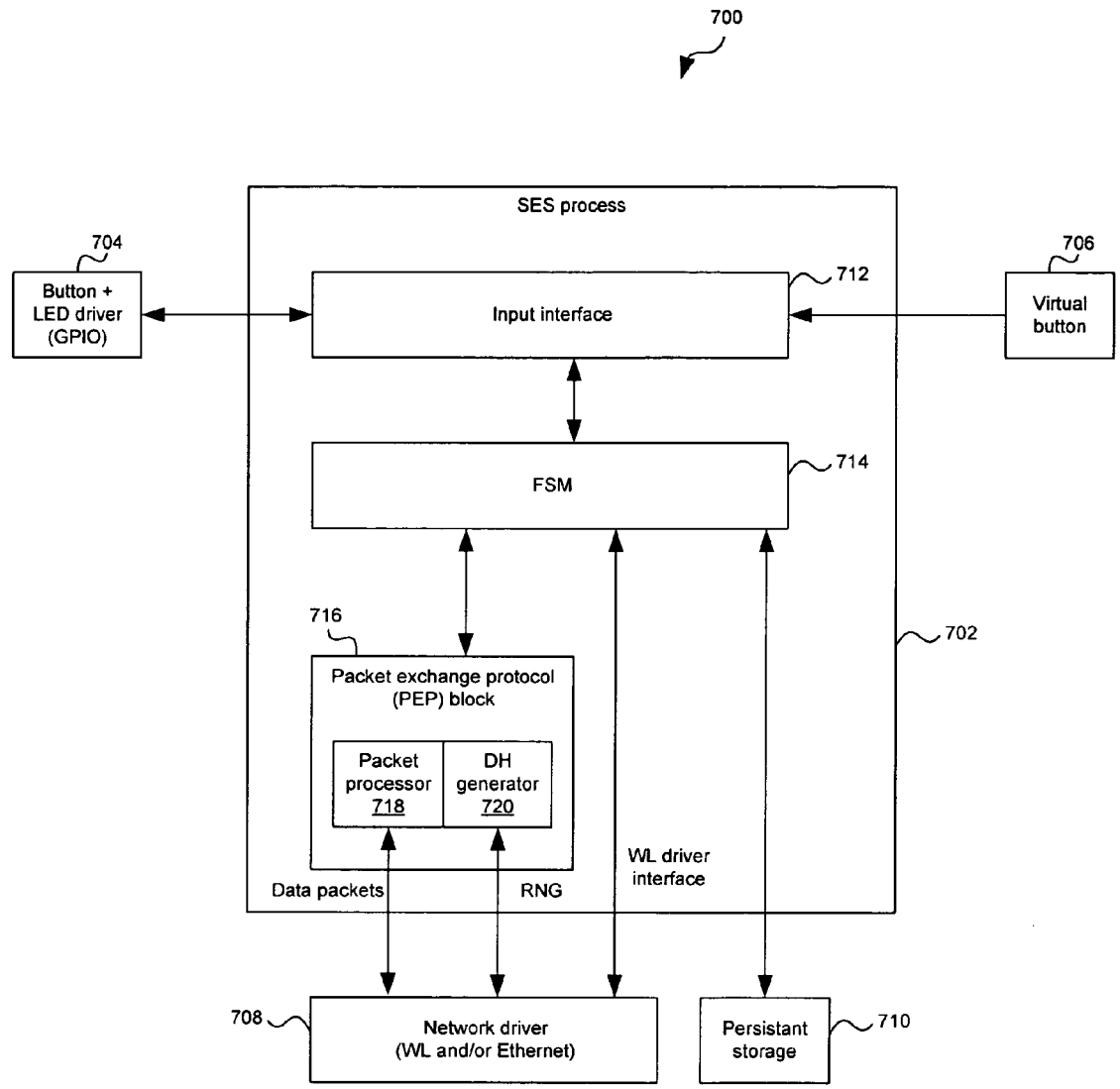
FIG. 7 is a block diagram illustrating an exemplary architecture to support secure communication setup, in accordance with an embodiment of the invention.

FIG. 7 is a block diagram illustrating an exemplary architecture to support secure communication setup, in accordance with an embodiment of the invention. Referring to FIG. 7, the architecture 700 may comprise a secure communication setup process 702, a button and LED driver 704, a virtual button 706, a network driver 708, and a persistent storage 710. The secure communication setup process 702 may comprise an input interface 712, a finite state machine 714, a packet exchange protocol (PEP) block 716. The PEP block 716 may comprise a packet processor 718 and a Diffie-Hellman (DH) generator 720.

The secure communication setup process 702 may perform a set of tasks executed by a configurator or by a client station, in association with a secure communication network setup protocol. For example, the secure communication setup process 702 may monitor events that initiate a secure communication network setup protocol as described in FIGS. 6A-6B. The secure communication setup process 702 may also be adapted to handle dispatching of commands to other software modules and/or hardware devices that may perform specific tasks in relation to the secure communication network setup protocol. For example, the secure communication setup process 702 may send commands, instructions, and/or control signals to the button and LED driver 704, the network driver 708, and/or the persistent storage 710.

The button and LED driver 704 may correspond to a software module that may generate a configuration start signal that may be received by the input interface 712 as an indication that a configuration operation may start. The button and LED driver 704 may be implemented via a general-purpose input/output (GPIO) interface, for example. The button and LED driver 704 may receive signals from the input interface 712 to provide a visual or lighting display in accordance with, for example, whether there was a long button activation or a short button activation. The virtual button 706 may correspond to a graphical user interface (GUI) representation of a physical button for the purpose of generating a configuration start signal that may be received by the input interface 712 as an indication that a configuration operation may start. The information generated by the virtual button 706 may be transferred to the input interface 712 via non-volatile random access memory (NVRAM) or some other mechanism. In some instances, the information generated by the virtual button 706 may be based on user input through a web page.

The input interface 712 may provide an input and output interface to the button and LED driver 704 and/or the virtual button 706. In this regard, the input interface may monitor signals generated by the button and LED driver 704 and/or the virtual button 706. The monitoring may be performed by, for example, periodically polling the outputs of the button and LED driver 704 and/or the virtual button 706. The input interface 712 may receive signals in response to user input actions, such as, for example, the pressing of a button by a user. The input interface 712 may also generate signals that provide information to a user, such as, for example, illuminating visual displays. The input interface 712 may also be adapted to send a message to the FSM 714 when a button has been pressed and a configuration operation is to start. The input interface 712 may correspond to an original equipment manufacturer (OEM) library or other library that may be configured according to the needs of the user and the implementation of the sources of the configuration start signal.

The PEP block 716 may provide an interface between the secure communication network setup protocol and higher layer protocols. For example, the PEP block 716 may enable the transfer of configuration information between the persistent storage 710 and the packet processor 718 via the FSM 714. The packet processor 718 may comprise suitable code adapted to encapsulate received secure communication network setup protocol information for presentation to a transport layer protocol entity via, for example, a service access point (SAP), or socket, that is accessible at the interface to the transport protocol layer. The packet processor 718 may also be adapted to encapsulate received information from a transport layer entity for presentation to a secure communication network setup protocol interface. The DH generator 720 may be responsible for tasks related to the execution of the Diffie-Hellman algorithm, for example. The packet processor 718 and the DH generator 720 may be adapted to exchange information.

The FSM 714 may comprise suitable logic, circuitry and/or code that may be adapted to control the configuration operations of the secure communication setup process 702. In this regard, the FSM 714 may generate instructions and/or control signals to portions of the secure communication setup process 702 to manage the configuration operation. The FSM 714 may be adapted to operate the configuration operations of a configurator or a client station.

The network driver 708 may be responsible for transferring and receiving messages to and from a configurator or a client station. In this regard, the network driver 708 may be adapted to support wireless (WL) communication, that is, the network driver 708 operates as a wireless driver. The network driver 708 may also be adapted to support wired communication, that is, the network driver 708 operates as a wireline and/or wired driver, such as an Ethernet driver. The network driver 708 may communicate with the secure communication setup process 702 via the packet processor 718, the DH generator 720, and/or the FSM 714. When communicating with the packet processor 718, the network driver 708 may utilize a data packet interface.

The DH generator 720 may utilize the network driver 708 for random number generation (RNG). The network driver 708 may communicate with the FSM 714 by utilizing a wireless (WL) driver interface. In this regard, the network driver 708 may communicate with the FSM 714 when the client station is a wireless station and the FSM 714 may need to indicate to the client station via beacon messages that the configurator timing window is open and the configurator is ready. The persistent storage 710 may store configuration information and may be implemented in, for example, an NVRAM device.

The virtual button 706, the FSM 714, the PEP block 716, the packet processor 718, and/or the DH generator 720 in the architecture 700 may be platform independent. These software modules may be ported to a plurality of physical platforms such as computers, workstations, LAN network devices, or WLAN networks devices without requiring changes in software code. The button and LED driver 704, the network driver 708, and/or the persistent storage 710 may be platform dependent. These software modules may require changes in software code when porting these components of the architecture 700 to a plurality of physical platforms. Porting the input interface 712 to a plurality of physical platforms may require extensions such as vendor extensions and/or modifications in the software code supplied by, fore example, a vendor that provides the physical platform.

The components of the architecture 700 shown in FIG. 7 may represent software modules that may run on a configurator regardless of whether the configurator is physically located as a stand-alone functionality in a terminal device, LAN device, or WLAN device, as in, for example, client stations 104, 106, and/or 108, or whether the configurator is physically collocated with other functionality in a terminal device, LAN device, or WLAN device, as in, for example, 208 and 218 in FIG. 2. Moreover, the components of the architecture 700 may also represent software modules that may run on a client station during the operation of a secure communication network setup protocol.

Figure 8:
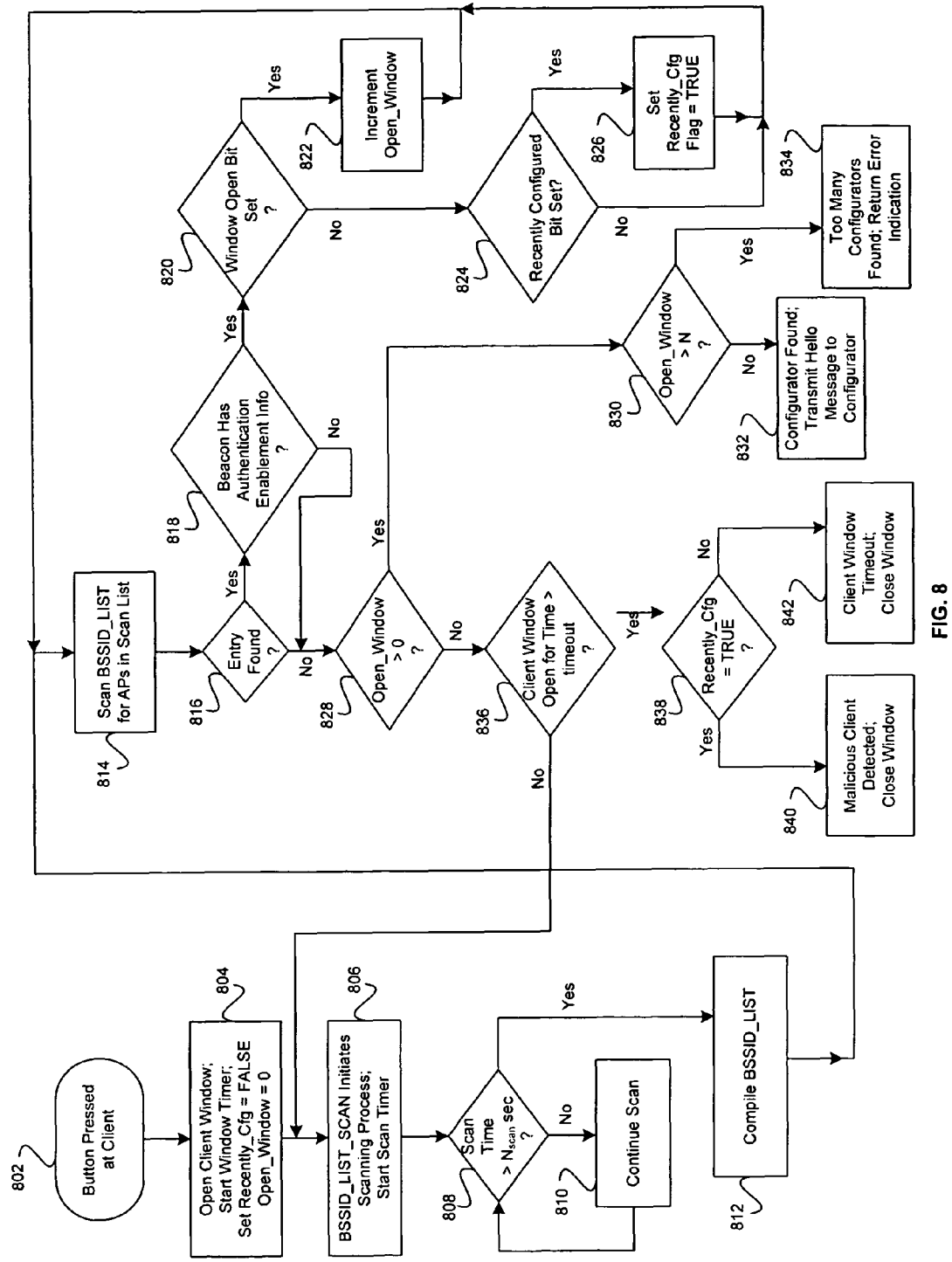
FIG. 8 is a flowchart illustrating exemplary steps in a discovery protocol, in accordance with an embodiment of the invention.

FIG. 8 is a flowchart illustrating exemplary steps in a discovery protocol, in accordance with an embodiment of the invention. The discovery protocol comprises a process by which a client station 204 may locate a collocated device 208 functioning as a configurator, with which to initiate an authentication exchange as described in FIG. 6, for example. With reference to FIG. 8, in step 802, a button may be activated at the client station 204. In step 804, a client window may be opened, a window timer that may determine a time duration for which the client window is to remain open may be started, the flag may be set recently_cfg=FALSE, and the counter may be set open_window=0. The flag recently_cfg may indicate whether a located configurator has already configured a client in the current configurator timing window open time interval. The counter open_window may indicate a number of collocated configurator station and access points 208 functioning as configurators, located, by a client station 204, for which the configurator timing window is open.

In step 806, the BSSID_LIST_SCAN directive may initiate a scanning process at the client station 204. The scanning process may comprise steps that are performed by the client station 204 to locate a collocated device functioning as a configurator, for example. A corresponding scan timer may be started that defines a duration of a time interval during which the scanning process will be executed at the client station 204. The identifier BSSID_LIST_SCAN, for example, may represent an object identifier (OID), in accordance with the network driver interface specification (NDIS), that may be utilized to initiate a search for APs at the client station 204. The client station 204 may attempt to locate collocated configurator station and access points 208 functioning as APs, in a BSS 202. Step 808 may determine if the scanning process time interval has expired. The client station may attempt to scan for a time interval $N_{scan}$ that comprises 6 seconds, for example, from the time instant at which the scan timer was started. If the scanning time interval has not expired, step 810 may continue scanning at step 808.

At step 812, the BSSID_LIST may comprise a listing of information received from beacon frames received from collocated configurator station and access points 208 functioning as APs that were located by the client station 204 during the scan. The list may comprise zero, or a plurality of entries. Each entry in the list may comprise information that was received in a beacon frame by the client station 204. The received beacon frame may or may not comprise authentication enablement information. In step 814, the BSSID_LIST may be scanned to detect information received from a collocated device 208 functioning as a configurator. At step 816, if a list entry is found, step 818 may determine if the beacon frame associated with the entry contains the authentication enablement information. If the beacon frame for the entry does contain authentication enablement information, step 820 may determine if the window_open flag is set in the list entry. If the window_open flag is set to a value TRUE, this may indicate that a collocated device 208, functioning as a configurator, has been located that is ready to configure a client station 204. Step 822 may increment the value of the counter open_window. If the flag window_open is not set to a value TRUE, step 824 may determine if the flag recently_cfg is set to a value TRUE in the list entry. If the flag recently_cfg is set to a value TRUE in the list entry, step 826 may set the recently_cfg flag, which is utilized by the discovery protocol, equal to a logical value TRUE.

If no entry is found at step 816, step 828 may determine if the current value of the counter open_window is greater than 0. If the value of the counter open_window is greater than 0, step 830 may determine if the current value of the counter open_window is greater than the value N, where N may be a threshold value, N=1, for example. If the counter open_window is not greater than N, step 832 may determine that at least one collocated device 208 functioning as a configurator, has been found. Subsequently, the client station 204 may communicate a hello packet, associated with the step 616, to the collocated device 208, functioning as a configurator. If the value of the counter open_window is greater than N, step 834 may generate an error indication. The error indication generated in step 834 may be displayed in a user interface at the client station 204.

If the value of the counter open_window is not found to be greater than 0 at step 828, step 836 may determine if the client timing window has been open for a period of time greater than the configured timeout period for the client station 204. If the client timing window has not been open for a period of time greater than the timeout period the discovery process may continue to scan for beacon frames received from a collocated device 208, functioning as an access point at step 806. If the client timing window has been open for a period of time greater than the timeout period, step 838 may determine if the flag recently_cfg is set to indicate a value TRUE. If the flag recently_cfg=TRUE, step 840 may detect a malicious client, and close the client timing window. A malicious client may be an unauthorized wireless terminal device that has been configured by the collocated device 208, functioning as a configurator, during the current configurator timing window open time duration. If the flag recently_cfg is not equal to TRUE, step 842 may detect a client window timeout. The client timing window may be subsequently closed.

Figure 9:
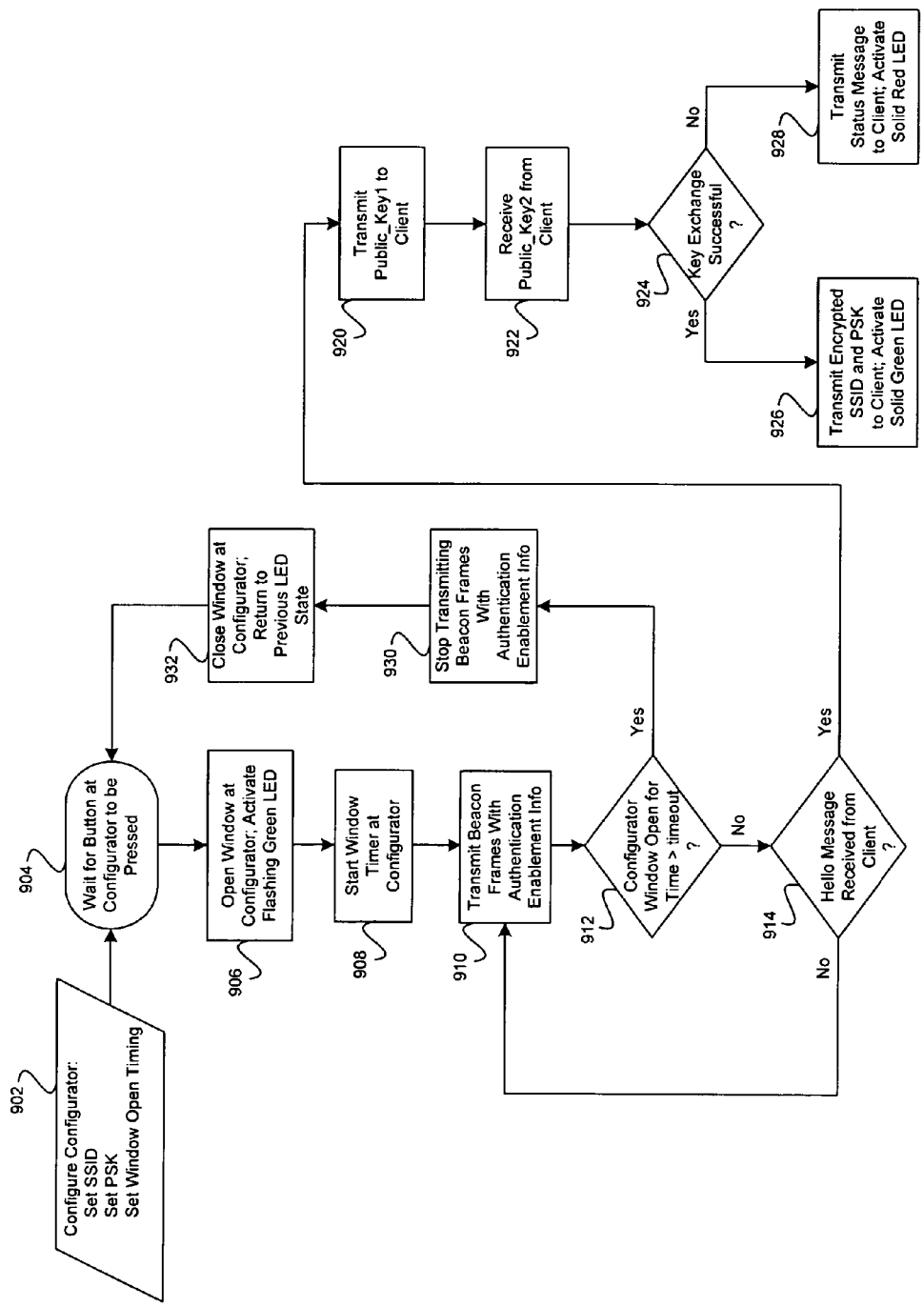
FIG. 9 is a flowchart illustrating exemplary steps performed by a configurator, in accordance with an embodiment of the invention.

FIG. 9 is a flowchart illustrating exemplary steps performed by a configurator, in accordance with an embodiment of the invention. In step 902, the collocated device 208 functioning as a configurator, may be configured by setting SSID and passphrase, and setting the window open time. The window open time may comprise a time duration during which the configurator timing window may remain open within a single configurator timing window open time interval. The collocated device 208 functioning as a configurator may be configured either manually, or based on a long button activation. In step 904, there may be a wait for a button at collocated device 208 functioning as a configurator, to be activated. In step 904, activating a button at the collocated device 208 functioning as a configurator, may initiate the protocol at the collocated device 208 functioning as a configurator. In step 906, the configurator timing window may be opened and a flashing green light emitting diode (LED), for example, activated at the collocated device 208 functioning as a configurator. In step 906, if the LED, for example, at the collocated device 208 functioning as a configurator, is activated to flashing green, it may indicate that the collocated device 208 functioning as a configurator, is configuring a client station 204, or ready to configure a client station 204. In step 908, a configurator timing window timer may be started at the collocated device 208 functioning as a configurator. In step 910, the collocated device 208 functioning as a configurator, may transmit beacon frames comprising authentication enablement information, associated with the step 605. Step 912 may determine if the configurator timing window has been open for a period of time greater than the configured window open timing value as specified in step 902. If the configurator timing window has been open for a period of time greater than the configured timeout value, step 930 may stop transmitting beacon frames from the collocated device 208 functioning as a configurator, that comprise authentication enablement information. Step 932 may close the configurator timing window and return the LED, for example, at the collocated device 208 functioning as a configurator, to the state that was in effect prior to the most recent button press at the collocated device 208 functioning as a configurator.

If no client stations 204 have been configured by the collocated device 208 functioning as a configurator, since the most recent long activation of the button at the collocated device 208 functioning as a configurator, the LED, for example, may be deactivated at step 904. If client stations 204 have been successfully authenticated and configured by the collocated device 208 functioning as a configurator, since the most recent long activation of the button at the collocated device 208 functioning as a configurator, the LED, for example, may be activated to solid green at step 904. If the LED, for example, at the collocated device 208 functioning as a configurator, is deactivated, it may indicate that the collocated device 208 functioning as a configurator, is unconfigured. If the LED, for example, at the collocated device 208 functioning as a configurator, is activated to solid green, it may indicate that the collocated device 208 functioning as a configurator, is configured and has configured at least one client station 204.

If the configurator timing window has not been open for a period of time greater than the configured timeout value, step 914 may determine if a hello message, associated with the step 616, has been received from a client 204. If a hello message, associated with the step 616, has not been received at step 914, the collocated device 208 functioning as a configurator, may continue sending beacon frames, associated with the step 605, at step 910. If a hello message, associated with the step 616, has been received from a client station 204, in step 920, a key 1 message, associated with the step 618, may be sent to the client station 204. In step 922, a key 2 message, associated with the step 620, may be received from the client station 204. In step 924, the collocated device 208 functioning as a configurator, may determine whether the key exchange, comprising messages key 1, associated with the step 618, and key 2, associated with the step 620, was successful. If the key exchange was successful, in step 926 the collocated device 208 functioning as a configurator, may transmit configuration information, associated with the step 622, to the client station 204, and activate a solid green LED, for example, at the configurator 204. If the key exchange was not successful, in step 928 the collocated device 208 functioning as a configurator, may return a status message, associated with the step 624, to the client station 204 indicating a failure. The collocated device 208 functioning as a configurator, may activate a solid red LED, for example.

Figure 10:
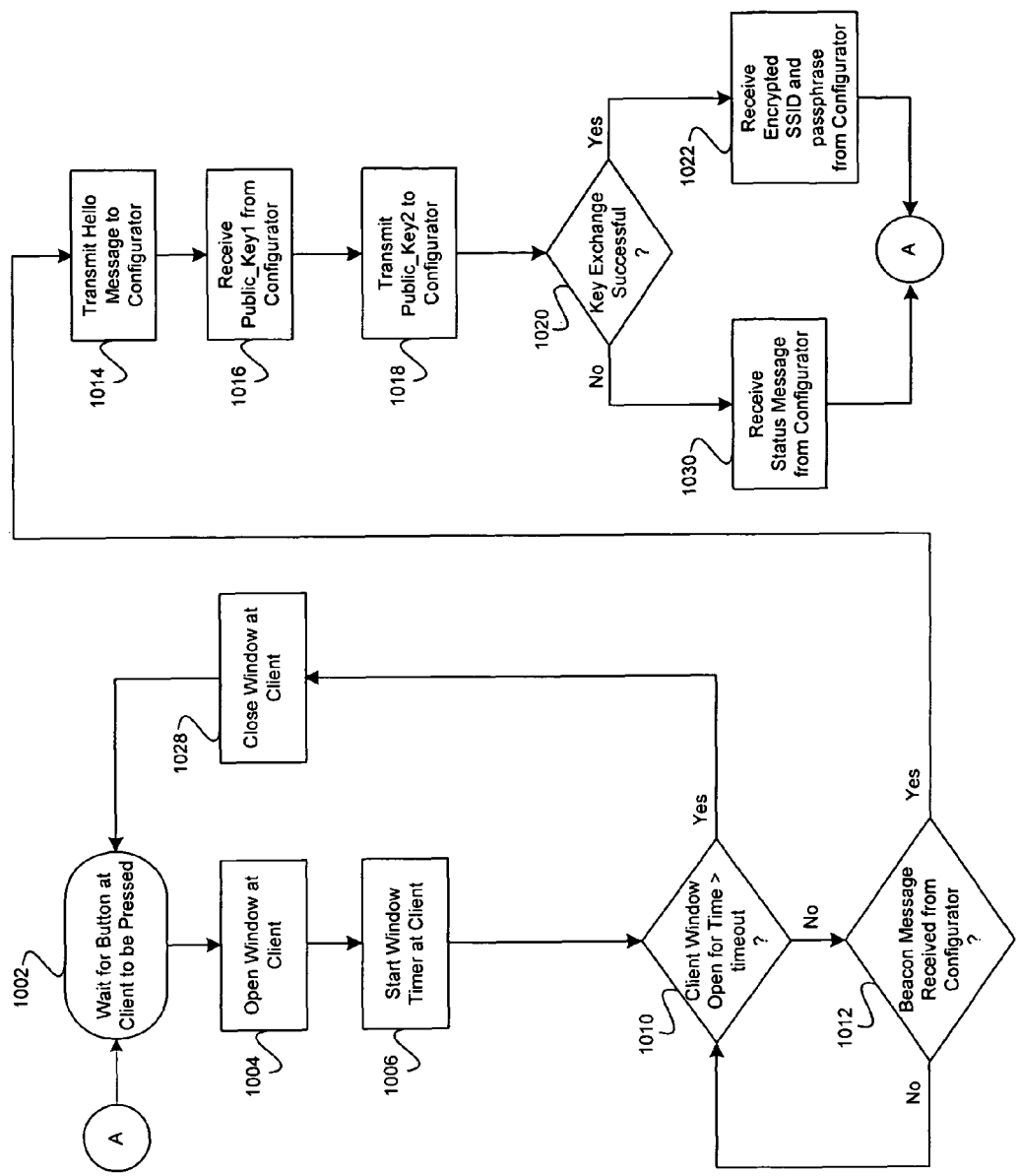
FIG. 10 is a flowchart illustrating exemplary steps performed by the client in the configuration protocol, in accordance with an embodiment of the invention.

FIG. 10 is a flowchart illustrating exemplary steps performed by the client in a configuration protocol, in accordance with an embodiment of the invention. With reference to FIG. 10, in step 1002, the start of the configuration protocol at the client station 204 may wait until a button is activated at the client station 204. In step 1004, a client timing window may be opened at the client station 204. In step 1006 a window timer may be started at the client station 204. The window timer may be utilized to detect a timeout that marks the end of the open time interval for the client timing window. In step 1010, the client station may determine whether a timeout duration, which is a time interval for the client timing window to remain open, has expired. If the client timing window has been open for a period of time greater than timeout duration, the client station 204 may close the client timing window at step 1028.

If the client timing window has not been open for a period of time greater than the timeout duration, step 1012 may determine if a beacon message, associated with the step 605, comprising authentication enablement information, has been received from the collocated device 208 functioning as a configurator. If a beacon message, associated with the step 605, has not been received from the collocated device 208 functioning as a configurator, the client may continue to wait at step 1010. If a beacon message, associated with the step 605, has been received from the collocated device 208 functioning as a configurator, in step 1014 the client station 204 may transmit a hello message, associated with the step 616, to the configurator 204. In step 1016, a key 1 message, associated with the step 618, may be received from the collocated device 208 functioning as a configurator. In step 1018, a key 2 message, associated with the step 620, may be transmitted to the collocated device 208 functioning as a configurator. Step 1020 may determine if the key exchange with the collocated device 208 functioning as a configurator, comprising messages associated with the steps 618 and 620, was successful. If the key exchange was successful, at step 1022 a configuration message, associated with the step 622, may be received from the collocated device 208 functioning as a configurator, comprising an SSID and encrypted passphrase. If the key exchange in step 1020 was not successful, at step 1030, a status message, associated with the step 624, indicating failure may be received from the collocated device 208 functioning as a configurator. Subsequent to steps 1022 and/or 1030, step 1002 may follow.

In one aspect of the invention, a method and a system for enabling communication of information in a communication system are provided. The system may comprise a client station 204 that receives authentication enablement information from a configurator station, for example a collocated device 208 functioning as a configurator, comprising an indication of a current state of a configurator timing window. The user desiring to initiate configuration of a client device may then provide inputs, activating a button at the client station 204 for example, to communicate authentication response information to the configurator station, for example the collocated device 208 functioning as a configurator, based on the received authentication enablement information. The client station 204 may subsequently receive the desired configuration information, thereby enabling the client station 204 to access a WLAN and to engage in secure communications via the WLAN. Alternately, the client station 204 may receive status information from the configurator station, for example the collocated device 208 functioning as a configurator.

In another aspect of the invention, a system for enabling communication of information in a communication system may comprise pressing a button at a configurator station, for example a collocated device 208 functioning as a configurator, to transmit authentication enablement information to a client station 204. The authentication enablement information may comprise an indication of a current state of a configurator timing window. The indication of the current state of the configurator timing window may define a period of time during which a client station 204 may be configured by the configurator station, for example the collocated device 208 functioning as a configurator. The configurator station, for example the collocated device 208 functioning as a configurator, may subsequently receive authentication response information from the client station 204 based on the transmitted authentication enablement information. The configurator station, for example the collocated device 208 functioning as a configurator, may subsequently transmit the desired configuration information, thereby enabling the client station 204 to securely access a WLAN and to engage in secure communications via the WLAN. Alternately, the configurator, for example the collocated device 208 functioning as a configurator, may transmit status information based on the authentication response information received from the client station 204.

Figure 11:
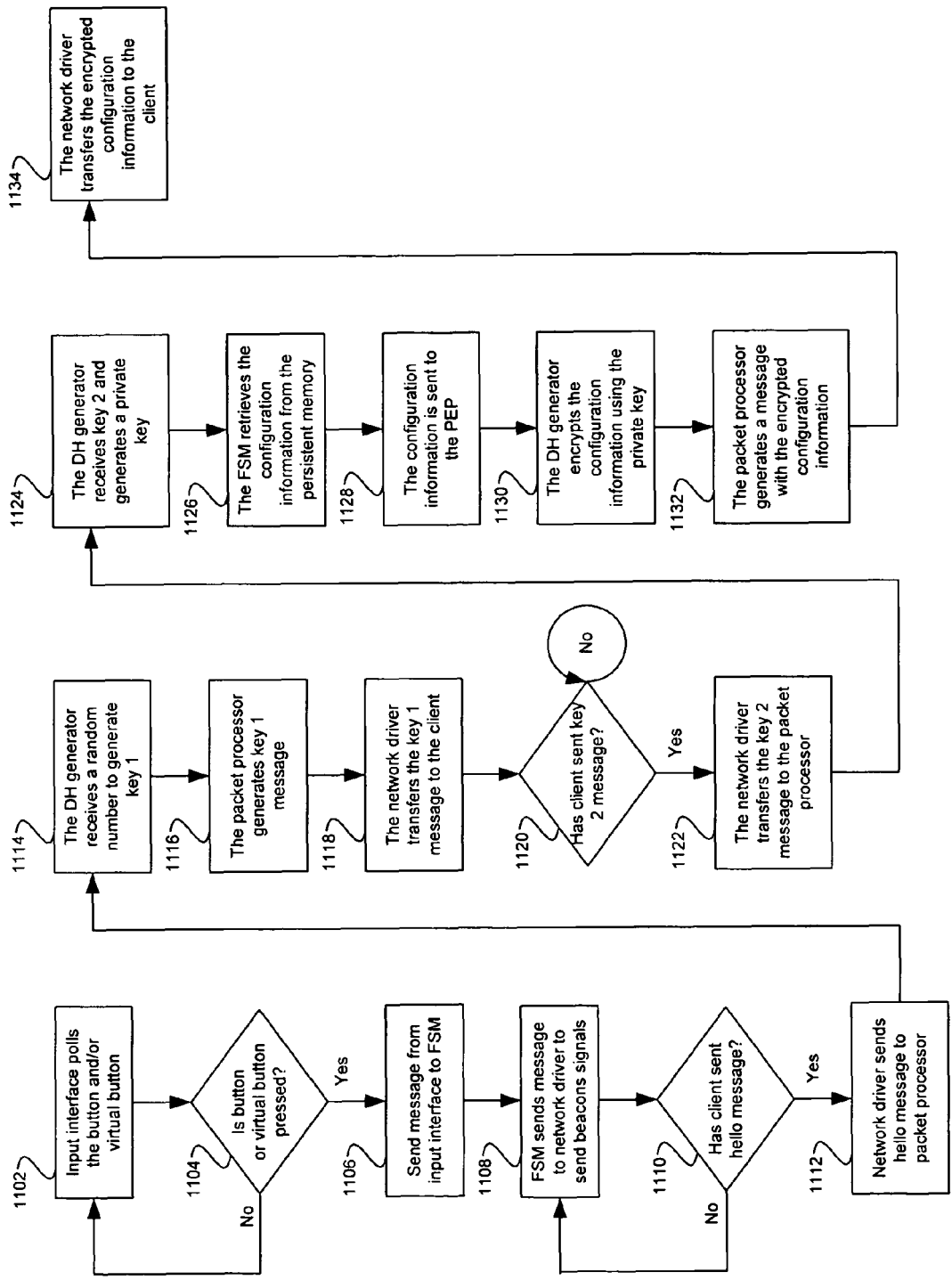
FIG. 11 is a flowchart illustrating exemplary steps in the operation of the architecture in a configurator, in accordance with an embodiment of the invention.

FIG. 11 is a flowchart illustrating exemplary steps in the operation of the architecture in a configurator, in accordance with an embodiment of the invention. Referring to FIG. 11, in step 1102, the input interface 712 in FIG. 7 may, for example, poll the button 704 or the virtual button 706 in a configurator to determine when a configuration start signal has been generated to indicate that the configuration operation and its associated configurator timing or registration window may start. In step 1104, the input interface 712 may determine from the polling in step 1102 whether the button 704 or the virtual button 706 has been pressed and whether a configuration start signal has been generated. When the button 704 or the virtual button 706 has not been pressed, the process may return to step 1102 where the input interface 712 may continue to poll the button 704 or the virtual button 706 in the configurator. When the button 704 or the virtual button 706 has been pressed, the process may proceed to step 1106. Moreover, the input interface 712 may determine based on the configuration start signal whether the pressing of the button 704 or the virtual button 706 corresponds to a long button activation or to a short button activation.

In step 1106, the input interface 712 may send a message to the FSM 714 to start generating control signals for controlling and/or managing the configurator operations associated with the secure communication network setup protocol described in FIGS. 6A-6B. In step 1108, the FSM 714 may send a message to the network driver 708 to send beacon signals or messages that indicate that the configurator timing window is open and that the configurator is ready to configure a client station. In step 1110, the communication setup process 702 may wait until a hello message is received from a client station seeking configuration information for a secure communication network setup. In instances where the network driver 708 has not received the hello message, the process may return to step 1108 and the communication setup process

702 may continue to send beacon messages to client stations within its range. When the network driver 708 receives a hello message from a client station, the process may proceed to step 1112.

In step 1112, the network driver 708 may send the hello message to the packet processor 718 for processing. The packet processor 718 may indicate to the DH generator 720 that a hello message has been received from a client station seeking configuration information. In step 1114, the DH generator 720 may receive a random number generated by the network driver 708 to generate a first public key, key 1. In this regard, the FSM 714 may generate signals that control the operations that generate the random number and/or the first public key, for example. In step 1116, the packet processor 718 may receive the first public key from the DH generator 720 and may generate a message that comprises the first public key, key 1 message. In step 1118, the network driver 708 may receive the key 1 message from the packet processor 718 and may transfer the key 1 message to the client station seeking configuration information.

In step 1120, the communication setup process 702 may wait until the client station sends a message comprising a second public key, key 2 message. In instances where the network driver 708 has not received the key 2 message, the communication setup process 702 may continue to wait in step 1120 until the key 2 message is received. When the network 708 receives the key 2 message from the client station seeking configuration information, the process may proceed to step 1122.

In step 1122, the network driver 708 may transfer the key 2 message to the packet processor 718. In step 1124, the packet processor 718 may transfer the second public key, key 2, in the key 2 message to the DH generator 720. The DH generator 720 may utilize the first public key, key 1, and the second public key, key 2, to generate a private key. In this regard, the FSM 714 may generate signals that control the operations that generate the private key, for example. In step 1126, the FSM 714 may retrieve from the persistent storage 710 the configuration information, for example, the SSID and passphrase. In step 1128, the FSM 714 may transfer the configuration information to the packet exchange protocol (PEP) block 716. In step 1130, the DH generator 720 may encrypt the configuration information with the private key generated in step 1124. In step 1132, the packet processor 718 receives the encrypted configuration information from the DH generator 720 and generates an encrypted configuration information message. In step 1134, the network driver 708 may receive the encrypted configuration information message from the packet processor 718 and may transfer the encrypted configuration information message to the client station.

The flowchart shown in FIG. 11 may correspond to an instance where the client station is a wireless device and a secure method for exchanging the configuration information may be necessary. In this regard, the network driver 708 may be, for example, a wireless (WL) driver. However, in instances where the client station is not a wireless device, but is operatively coupled to the configurator via a wired local area network, for example, the steps associated with sending beacon signals as described in the exemplary steps shown in FIG. 11 may not be utilized. In this regard, the network driver 708 may be, for example, a wired line driver such as an Ethernet driver.

Figure 12:
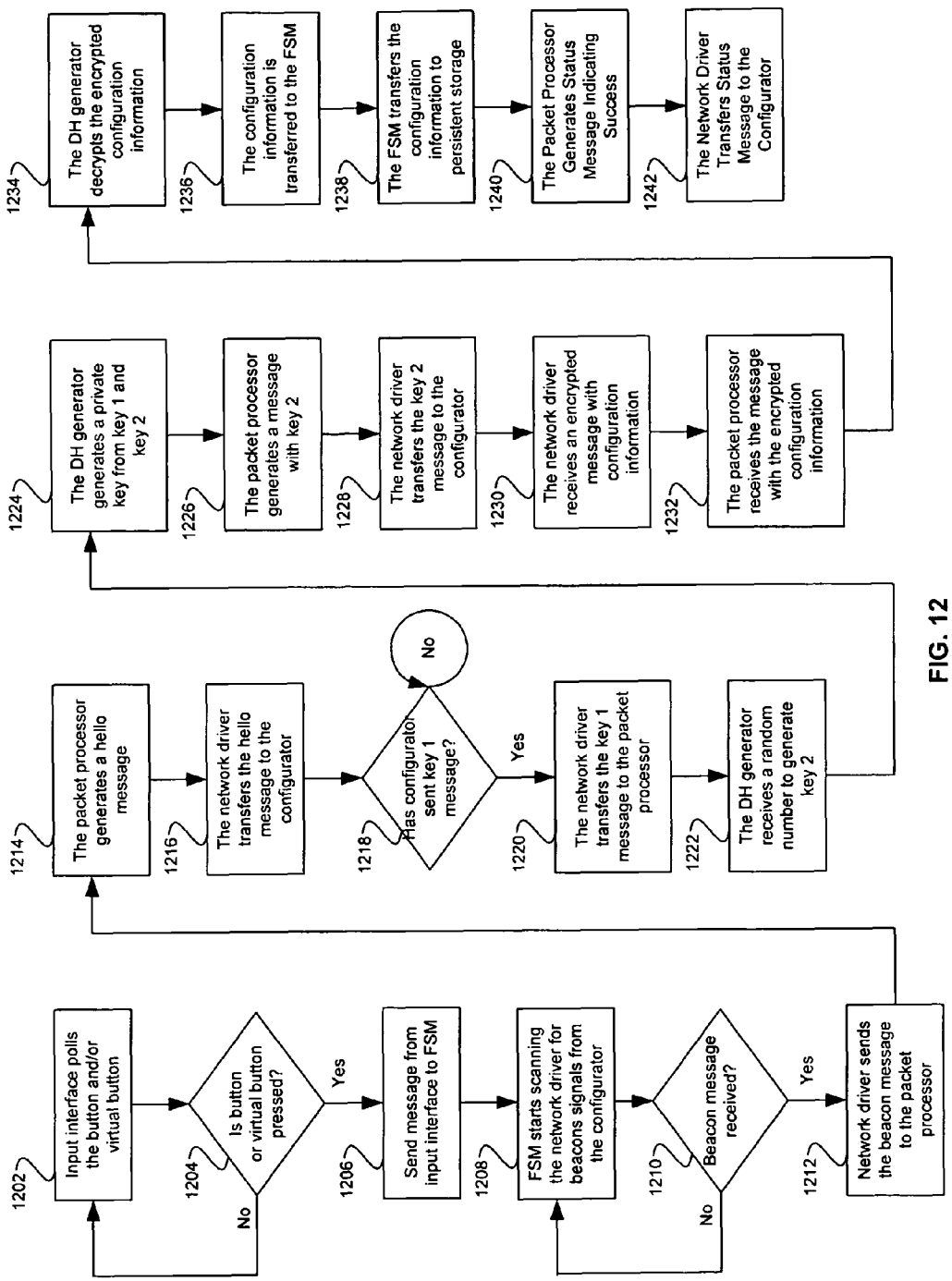
FIG. 12 is a flowchart illustrating exemplary steps in the operation of the architecture in a client, in accordance with an embodiment of the invention.

FIG. 12 is a flowchart illustrating exemplary steps in the operation of the architecture in a client, in accordance with an embodiment of the invention. Referring to FIG. 12, in step 1202, the input interface 712 in FIG. 7 may, for example, poll the button 704 or the virtual button 706 in a client station to determine when a configuration start signal has been generated to indicate that the client station is seeking configuration information from a configurator to establish a secure communication network setup with a WLAN. In step 1204, the input interface 712 may determine from the polling in step 1202 whether the button 704 or the virtual button 706 has been pressed and whether a configuration start signal has been generated. When the button 704 or the virtual button 706 has not been pressed, the process may return to step 1202 where the input interface 712 may continue to poll the button 704 or the virtual button 706 in the client station. When the button 704 or the virtual button 706 has been pressed, the process may proceed to step 1206. Moreover, the input interface 712 may determine based on the configuration start signal whether the pressing of the button 704 or the virtual button 706 corresponds to a long button activation or to a short button activation.

In step 1206, the input interface 712 may send a message to the FSM 714 to start generating control signals for controlling and/or managing the client station operations associated with the secure communication network setup protocol described in FIGS. 6A-6B. In step 1208, the FSM 714 may scan information received by the network driver 708 to determine whether a beacon message from the configurator has been received indicating that the configurator timing window is open and that the configurator is ready to configure a client station. In step 1210, the communication setup process 702 may wait until an appropriate beacon message is received from the configurator. When the network driver 708 has not received the appropriate beacon message, the process may return to step 1208 and the communication setup process 702 may continue to scan for the beacon messages from the configurator. When the network driver 708 receives an appropriate beacon message from the configurator, the process may proceed to step 1212.

In step 1212, the network driver 708 may send the beacon message to the packet processor 718. The packet processor 718 may process the beacon message and may determine that the configurator timing window is open and that the configurator is ready to configure a client station. In step 1214, the packet processor 718 may generate a hello message to indicate to the configurator that the client station is seeking configuration information to establish a secure communication network setup. In step 1216, the network driver 708 may transfer the hello message to the configurator.

In step 1218, the communication setup process 702 may wait until the configurator sends a message comprising a first public key, key 1 message. When the network driver 708 has not received the key 1 message, the communication setup process 702 may continue to wait in step 1218 until the key 1 message is received. When the network driver 708 receives the key 1 message from the configurator, the process may proceed to step 1220.

In step 1220, the network driver 708 may transfer the key 1 message to the packet processor 718. In step 1222, the DH generator 720 may receive a random number from the network driver 708 to generate a second public key, key 2. In step 1224, the DH generator 720 may generate a private key from the key 2 and the key 1 in the key 1 message. In this regard, the FSM 714 may generate signals that control the operations that generate the random number, the second public key and/or the private key, for example. In step 1226, the packet processor 718 may generate a message, key 2 message, which comprises the second public key, key 2. In step 1228, the network driver 708 may transfer the key 2 message to the configurator.

In step 1230, the communication setup process 702 may wait until the network driver 708 receives a message with encrypted configuration information. In step 1232, the packet processor 718 may receive the encrypted configuration information from the network driver 708. The packet processor 718 may retrieve the encrypted configuration information from the received message. In step 1234, the DH generator 720 may decrypt the encrypted configuration information utilizing the private key generated in step 1224. In step 1236, the decrypted configuration information may be transferred to the FSM 714. In step 1238, the FSM 714 may transfer the configuration information to the persistent storage 710. In step 1240, the packet processor may generate a status message indicating success. In step 1242, the network driver may transfer the status message to the configurator.

The flowchart shown in FIG. 12 may correspond to an instance where the client station is a wireless device and a secure method for exchanging the configuration information may be necessary. In this regard, the network driver 708 may be, for example, a wireless (WL) driver. However, in instances where the client station is not a wireless device, but is operatively coupled to the configurator via a wired local area network, for example, the steps associated with receiving and interpreting beacon messages as described in the exemplary steps shown in FIG. 12 may not be utilized. In this regard, the network driver 708 may be, for example, a wired line driver such as an Ethernet driver.

Another embodiment of the invention may provide a machine-readable storage, having stored thereon, a computer program having at least one code section executable by a machine, thereby causing the machine to perform the steps as described above for supporting the secure communication network setup protocol for a client station in a WLAN.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for enabling communication of information in a secure communication system, the method comprising:
    generating at least one encrypted configuration message within a configurator timing window when at least one configuration start signal is asserted, wherein the configurator timing window opens at a time corresponding to a beginning of a time during which a client station is permitted to be configured by a configurator; and
    transferring said generated at least one encrypted configuration message to the client station to enable secure communication between a configurator station and said client station.

2. The method according to claim 1, comprising generating at least one control signal in a finite state machine when said at least one configuration start signal has been asserted.

3. The method according to claim 1, comprising generating by a packet processor:
    at least one beacon message for establishing a secure wireless communication between said configurator station and said client station; and
    said at least one encrypted configuration message.

4. The method according to claim 3, comprising transferring said generated
    at least one beacon message to a network driver for broadcasting.

5. The method according to claim 1, comprising receiving a hello message from said client station in a packet processor.

6. The method according to claim 1, comprising receiving a random number in a Diffie-Hellman (DH) generator.

7. The method according to claim 6, comprising generating a first key in said DH generator based on said received random number.

8. The method according to claim 7, comprising generating a private key in said DH generator based on said first key and a second key received from said client station.

9. The method according to claim 8, comprising generating said at least one encrypted configuration message based on said generated private key.

10. The method according to claim 1, comprising retrieving said configuration information from a persistent storage device via a finite state machine.

11. A computer readable storage device having stored thereon, a computer program having at least one code for enabling communication of information in a secure communication system, the at least one code section being executable by a computer for causing the computer to perform steps comprising:
    generating at least one encrypted configuration message within a configurator timing window when at least one configuration start signal is asserted, wherein the configurator timing window opens at a time corresponding to a beginning of a time during which a client station is permitted to be configured by a configurator; and
    transferring said generated at least one encrypted configuration message to a client station to enable secure communication between a configurator station and said client station.

12. The computer readable storage device according to claim 11, wherein said at least one code section comprises code for generating at least one control signal in a finite state machine when said at least one configuration start signal has been asserted.

13. The computer readable storage device according to claim 11, wherein said at least one code section comprises code for generating by a packet processor:

at least one beacon message in a packet processor for establishing secure wireless communication between said configurator station and said client station; and said at least one encrypted configuration message.

14. The computer readable storage device according to claim 13, wherein said at least one code section comprises code for transferring said generated at least one beacon message to a network driver for broadcasting.

15. The computer readable storage device according to claim 11, wherein said at least one code section comprises code for receiving a hello message from said client station in a packet processor.

16. The computer readable storage device according to claim 11, wherein said at least one code section comprises code for receiving a random number in a Diffie-Hellman (DH) generator.

17. The computer readable storage device according to claim 16, wherein said at least one code section comprises code for generating a first key in said DH generator based on said received random number.

18. The computer readable storage device according to claim 17, wherein said at least one code section comprises code for generating a private key in said DH generator based on said first key and a second key received from said client station.

19. The computer readable storage device according to claim 18, wherein said at least one code section comprises code for generating said at least one encrypted configuration message based on said generated private key.

20. The computer readable storage device according to claim 11, wherein said at least one code section comprises code for retrieving said configuration information from a persistent storage device via a finite state machine.

21. A system for enabling communication of information in a secure communication system, the system comprising:

a configurator station that is operable to generate at least one encrypted configuration message in a packet processor within a configurator timing window when at least one configuration start signal is asserted, wherein the configurator timing window opens at a time corresponding to a beginning of a time during which a client station is permitted to be configured by a configurator; and said configurator station is operable to transfer said generated at least one encrypted configuration message to a client station to enable secure communication between said configurator station and said client station; wherein said configurator station is a configurator device.

22. The system according to claim 21, wherein said configurator station is operable to generate at least one control signal in a finite state machine when said at least one configuration start signal has been asserted.

23. The system according to claim 21, wherein said configurator station is operable to generate at least one beacon message in said packet processor for establishing a secure wireless communication between said configurator station and said client station.

24. The system according to claim 23, wherein said configurator station is operable to transfer said generated at least one beacon message to a network driver for broadcasting.

25. The system according to claim 21, wherein said configurator station is operable to receive a hello message from said client station in said packet processor.

26. The system according to claim 21, wherein said configurator station is operable to generate a random number.

27. The system according to claim 26, wherein said configurator station is operable to generate a first key in a Diffie-Hellman (DH) generator based on said generated random number.

28. The system according to claim 27, wherein said configurator station is operable to generate a private key in said DH generator based on said first key and a second key received from said client station.

29. The system according to claim 28, wherein said configurator station is operable to generate said at least one encrypted configuration message based on said generated private key.

30. The system according to claim 21, wherein said configurator station is operable to retrieve said configuration information from a persistent storage device via a finite state machine.

* * * * *